United States Patent
Nomura et al.

(10) Patent No.: US 6,555,957 B1
(45) Date of Patent: *Apr. 29, 2003

(54) ELECTRON BEAM APPARATUS AND IMAGE-FORMING APPARATUS

(75) Inventors: Ichiro Nomura, Atsugi; Masato Yamanobe, Machida; Hidetoshi Suzuki, Fujisawa; Toshihiko Takeda; Tatsuya Iwasaki, both of Atsugi, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/003,154

(22) Filed: Jan. 6, 1998

Related U.S. Application Data

(62) Division of application No. 08/838,734, filed on Apr. 10, 1997, now Pat. No. 6,348,761, which is a continuation of application No. 08/263,882, filed on Jun. 22, 1994.

(30) Foreign Application Priority Data

Dec. 28, 1993 (JP) ............................................. 5-336708

(51) Int. Cl.⁷ ................................................ H01J 17/49
(52) U.S. Cl. ...................... 313/495; 313/512; 313/422
(58) Field of Search ................. 313/422, 495, 313/308, 309, 512

(56) References Cited

U.S. PATENT DOCUMENTS

| | | | |
|---|---|---|---|
| 3,763,346 A | 10/1973 | Drechsler et al. | ........... 219/121 |
| 3,945,698 A | 3/1976 | Fukuhara et al. | ............. 316/26 |
| 4,954,744 A | 9/1990 | Suzuki et al. | ............... 313/336 |
| 5,066,883 A | 11/1991 | Yoshioka et al. | ........... 313/309 |
| 5,505,647 A | 4/1996 | Sato et al. | ..................... 445/25 |
| 5,828,352 A | 10/1998 | Nomura et al. | ................ 345/74 |

FOREIGN PATENT DOCUMENTS

| | | | |
|---|---|---|---|
| DE | 3432877 | 3/1986 | |
| EP | 0658924 | 6/1995 | |
| JP | 62-13781 | 3/1987 | |
| JP | 63-279535 | 11/1988 | |
| JP | 64-31332 | 2/1989 | ............ H01J/29/48 |
| JP | 1279542 | 11/1989 | ............. H01J/1/30 |
| JP | 01283749 | 11/1989 | ............ H01J/31/15 |
| JP | 1309242 | 12/1989 | |
| JP | 5-77135 | 10/1993 | |

OTHER PUBLICATIONS

"Scanning Tunnelling Microscopic Investigations of Electroformed Planar Metal–insulator–metal Diodes", H. Pagnia, N. Sotnik and W. Wirth, Int. J. Electronics, vol. 73, No. 69, No. 1, 25–32 (1990).

"Energy Distribution of Emitted Electrons from Electroformed MIM Structures: The Carbon Island Model", M. Bischoff, H. Pagnia and J. Trickl, Int. J. Electronics, vol. 73, No. 5, 1009–1010 (1992).

(List continued on next page.)

*Primary Examiner*—Ashok Patel
(74) *Attorney, Agent, or Firm*—Fitzpatrick, Cella, Harper & Scinto

(57) ABSTRACT

In an electron beam apparatus comprising an enclosure in which an electron-emitting device having an electron-emitting region between opposite electrodes is disposed, the electron-emitting device exhibits such a characteristic as that an emission current is uniquely determined with respect to a device voltage. The interior of the enclosure is maintained under an atmosphere effective to prevent structural changes of the electron-emitting device. An image-forming apparatus comprises an enclosure in which an electron source and an image-forming member are disposed, the electron source comprising the above electron-emitting device. An emission current is stable with a very small change in the amount of electrons emitted, a sharp image is produced with high contrast, and gradation control is easily carried out.

53 Claims, 21 Drawing Sheets

OTHER PUBLICATIONS

"On the Electron Emission from Evaporated Thin Au Films," M. Bischoff, R. Holzer and H. Pagnia Physics Letters, Vo. 62A, No. 7 (Oct. 3, 1977).

"The Electroforming Process in MIM Diodes," vol. 85, R. Blessing, H. Pagnia and N. Sotnik, Thin Solid Films, 119–128 (1981).

"Evidence for the Contribution of an Adsorbate to the Voltage–Controlled Negative Resistance of Gold Island Film diodes," R. Blessing, H. Pagnia and R. Schmitt, Thin Solid Films, vol. 78, 397–401 (1981).

"Water–Influenced Switching in Discontinuous Au Film Diodes," R. Muller and H. Pagnia, Materials Letters, vol. 2, No. 4A, 282–285 (Mar. 1984).

"Influence of Organic molecules on the Current–Voltage Characteristic of Planar MIM Diodes," H. Pagnia, N. Sotnik and H. Strauss, Phy. Stat, Sol. vol. 90, 771–778 (1985).

"Prospects for Metal/non–Metal Microsystems: Sensors, Sources and Switches," H. Pagnia, Int. J. Electronics, vol. 73, No. 5, 819–825 (1992).

"Carbon–NANOSLIT Model for The Electroforming Process in MIM Structure," M. Bischoff, Int. J. Electronics, vol. 70, No. 3, 491–498 (1991).

"Electroforming and Electron Emission of Carbon Thin Films," H. Araki, et al., Journal of the Vacuum Society of Japan, vol. 26, No. 1, 22–29 (1983).

"Influence of Gas Composition on Regeneration in Metal/Insulator/Metal Diodes," M. Borbonus, H. Pagnia and N. Sotnik, Thin Solid Films, vol. 151, pp. 333–342 (1987).

"Metal Influence on Switching MIM Diodes," H. Pagnia et al., phys. stat. sol. (a) 111,387 (1989) pp. 387–393.

Mei, et al., "Planar–Processed Tungsten and Polysilicon Vacuum Microelectronic Devices with Integral Cavity Sealing," J. Vac. Sci. Technol. B 11(2), Mar. 1993, pp. 493–496.

Chen, et al., "Air–Bridge Field–Emission Vacuum Device Fabrication with 0.1 $\mu$m Spacing," J. Vac. Sci. Technol. B 11(2), Mar. 1993, pp.497–500.

Advances in Electronics and Electron Physics, vol. 8, 1956, W.P. Dyke and W.W. Dolan, "Field Emission", pp. 89–185.

Journal of Applied Physics, vol. 47, No. 12, Dec. 1976, C.A. Spindt, et al., "Physical Properties of Thin–Film Field Emission Cathodes With Molybdenum Cones", pp. 5248–5263.

Journal of Applied Physics, vol. 32, No. 4, Apr. 1961, C.A. Mead, "Operation of Tunnel–Emission Devices", pp. 646–652.

Radio Engineering and Electronic Physics, Jul. 1965, M.I. Elinson, et al., "The Emission of Hot Electrons and the Field Emission of Electrons From Tin Oxide", pp. 1290–1296.

Thin Solid Films, Sep. 1972, G. Ditimer, "Electrical Conduction and Electron Emission of Discontinuous Thin Films", pp. 317–329.

International Electron Devices Meeting, 1975, M. Hartwell, et al. "Strong Electron Emission From Patterned Tin–Indium Oxide Thin Films", pp. 519–521.

"Thin Film Handbook," Committee 131 of Japanese Society for the Promotion of Art and Science, 1983.

STRIPE

MATRIX

ELECTRON BEAM APPARATUS AND IMAGE-FORMING APPARATUS

This is a divisional of application Ser. No. 08/838,734, filed on Apr. 10, 1997, now U.S. Pat. No. 6,348,761 B1, issued on Feb. 19, 2002, which is a continuation of application Ser. No. 08/263,882, filed on Jun. 22, 1994.

BACKGROUND OF THE INVENTION

1. Field of the Invention

The present invention relates to an electron beam apparatus and an image-forming apparatus, such as a display device, in which the electron beam apparatus is employed.

2. Related Background Art

Heretofore, two types of electron-emitting devices are known; i.e., a thermal electron source and a cold cathode electron source. Cold cathode electron sources include electron-emitting devices of field emission type (hereinafter abbreviated to FE type), metal/insulating layer/metal type (hereinafter abbreviated to MIM type), and surface conduction type (hereinafter abbreviated to SCE), etc.

Examples of FE type devices are described in, e.g., W. P. Dyke & W. W. Dolan, "Field emission", Advance in Electron Physics, 8, 89 (1956) and C. A. Spindt, "PHYSICAL Properties of thin-film field emission cathodes with molybdenium cones", J. Appl. Phys., 47, 5248 (1976).

One example of MIM type devices is described in, e.g., C. A. Mead, "The tunnel-emission amplifier", J. Appl. Phys., 32, 646 (1961).

One example of surface conduction electron-emitting devices is described in, e.g., M. I. Elinson, Radio Eng. Electron Phys., 10, (1965).

A surface conduction electron-emitting device utilizes a phenomenon that when a thin film having a small area is formed on a substrate and a current is supplied to flow parallel to the film surface, electrons are emitted therefrom. As to such a surface conduction electron-emitting device, there have been reported, for example, one using a thin film of $SnO_2$ by Elinson as cited above, one using an Au thin film (G. Ditter: "Thin Solid Films", 9, 317 (1972)), one using a thin film of $In_2O_3/SnO_2$ (M. Hartwell and C. G. Fonstad: "IEEE Trans. ED Conf.", 519 (1975)), and one using a carbon thin film (Hisashi Araki et. al.: "Vacuum", Vol. 26, No. 1, p. 22 (1983)).

As a typical configuration of those surface conduction electron-emitting devices, FIG. 25 shows the device configuration proposed by M. Hartwell in the above-cited paper. In FIG. 25, denoted by reference numeral 1 is an insulating substrate. 2 is a thin film for forming an electron-emitting region which comprises, e.g., a metal oxide thin film formed by sputtering into an H-shaped pattern. An electron-emitting region 3 is formed by the energizing process, i.e. flowing an electrical current, called forming (described later). 4 will be here referred to as a thin film including the electron-emitting region. The dimensions indicated by L1 and W in the drawing are set to 0.5–1 mm and 0.1 mm, respectively. The electron-emitting region 3 is shown schematically because its position and shape are not certain.

In those surface conduction electron-emitting devices, it has heretofore been common that the electron-emitting region forming thin film 2 is subjected to the energizing process called forming in advance to form the electron-emitting region 3 before starting emission of electrons. The term "forming" means the process of applying a DC voltage or a voltage rising very slowly at a rate of, for example, 1 V/minute, across the electron-emitting region forming thin film 2 to locally destroy, deform or denature it to thereby form the electron-emitting region 3 which has been transformed into an electrically high-resistance state. The electron-emitting region 3 emits electrons from the vicinity of a crack generated in a portion of the electron-emitting region forming thin film 2.

The electron-emitting region forming thin film 2 including the electron-emitting region 3 which has been formed by the forming process will be here referred to as the thin film 4 including electron-emitting region. In the surface conduction electron-emitting device after the forming process, a voltage is applied to the electron-emitting region including thin film 4 to supply the device with a current, whereupon electrons are emitted from the electron-emitting region 3.

The above surface conduction electron-emitting device is simple in structure and easy to manufacture, and hence has an advantage that a number of devices can be formed into an array having a large area. Therefore, various applications making use of such an advantage have been studied. Examples of the applications are an electron beam apparatus, e.g., a charged beam source and an electron beam machining apparatus, and a display device.

As an example in which a number of surface conduction electron-emitting devices are formed into an array, there is an electron source wherein surface conduction electron-emitting devices are arranged in parallel, both ends of the devices are interconnected by respective leads to form one row of an array, and a number of rows are arranged to form, the array. (See, e.g., Japanese Patent Application Laid-Open No. 64-31332). In the field of image-forming apparatus such as image display devices, particularly, flat type display devices using liquid crystals have recently become popular instead of CRTs, but they are not of an emission type and have a problem of requiring backlights or the like. Development of self-luminous display devices have therefore been desired. An image-forming apparatus in which an electron source having an array of numerous surface conduction electron-emitting devices and a fluorescent substance radiating visible light upon impingement of electrons emitted from the electron source are combined with each other to form a display device, is a self-luminous one which is relatively easy to manufacture and has good display quality while giving a large screen size. (See, e.g., U.S. Pat. No. 5,066,883).

In the conventional electron source comprising numerous surface conduction electron-emitting devices, a desired one of the devices, which is to emit electrons for causing the fluorescent substance to radiate light, is selected by combination of wirings (referred to as row-direction wirings) which interconnect both ends of the numerous surface conduction electron-emitting devices arranged in parallel, control electrodes (called grids) which are disposed in a space between the electron source and the fluorescent substance to lie in a direction (called a column direction) perpendicular to the row-direction wirings, and an appropriate drive signal applied to the row-direction wirings and the grids. (See, e.g., Japanese Patent Application Laid-Open No. 1-283749).

The electron-emitting devices are handled under a vacuum, but details of an electron-emitting characteristic of the surface conduction electron-emitting device under a vacuum are yet scarcely clear.

A description will now be made of problems caused in the conventional surface conduction electron-emitting devices as described above and the image-forming apparatus, etc. employing those devices.

Problem 1

If the conventional electron-emitting device is left not driven in an image-forming apparatus or an enclosure for maintaining a vacuum therein, an electrical characteristic (current-voltage) of the electron-emitting device is changed and an emission current from the device is increased temporarily. A change rate of the emission current depends on the period of time during which the device is left not driven (i.e., standing time), the vacuum atmosphere (degree of vacuum and kinds of residual gases), the driving voltage and so on.

Problem 2

In the conventional electron-emitting device, if a pulse width of the voltage applied to the device is changed, an emission current is varied and, therefore, it is difficult to control the amount of electrons emitted with the pulse width.

Problem 3

In the conventional electron-emitting device, if a value of the voltage applied to the device is changed, its electrical characteristic is varied and an emission current is also varied correspondingly. It is therefore difficult to control the amount of electrons emitted with the voltage value.

Problem 4

When the conventional electron-emitting devices having Problem 1 is employed in an image-forming apparatus, contrast and sharpness of the formed image are lowered because of a change in the intensity of electron beam. Particularly, when the formed image is a fluorescent image, brightness and color of the fluorescent image are varied.

Problem 5

When the conventional electron-emitting devices having Problems 2 and 3 are employed in an image-forming apparatus, a difficulty in control of the intensity of electron beam with the voltage or the pulse width thereof applied to the device makes it difficult to achieve gradation control of the formed image. Particularly, when the formed image is a fluorescent image, it is difficult to control brightness and color of the fluorescent image.

In view of the problems as described above, an object of the present invention is to provide an electron-emitting device and an electron beam generator in which an emission current is stable with a very small change in the amount of electrons emitted depending on the period of time during which the device is left not driven (i.e., standing time) and the vacuum atmosphere. Another object of the present invention is to provide an image-forming apparatus which can produce a sharp image with high contrast, in particular, an image-forming apparatus which can form a luminous image with a small change in brightness. Still another object of the present invention is to provide an image-forming apparatus in which it is easy to carry out gradation control, in particular, an image-forming apparatus which is easy to control brightness and color of a luminous image.

SUMMARY OF THE INVENTION

The above objects are achieved by the present invention summarized below.

With one aspect of the invention, there is provided an electron beam apparatus comprising an enclosure in which an electron-emitting device having an electron-emitting region between opposite electrodes is disposed, wherein the electron-emitting device exhibits a characteristic such that an emission current is uniquely determined with respect to a device voltage.

With another aspect of the invention, there is provided an electron beam apparatus comprising an enclosure in which an electron-emitting device having an electron-emitting region between opposite electrodes is disposed, wherein the interior of the enclosure is maintained under an atmosphere effective to prevent structural changes of the electron-emitting device.

With still another aspect of the invention, there is provided an image-forming apparatus comprising an enclosure in which an electron source and an image-forming member are disposed, the apparatus producing an image in response to an input signal, wherein the electron source comprises an electron-emitting device having an electron-emitting region between opposite electrodes, the electron-emitting device exhibiting a characteristic such that an emission current is uniquely determined with respect to a device voltage.

With yet another aspect of the invention, there is provided an image-forming apparatus comprising an enclosure in which an electron source and an image-forming member are disposed, the apparatus producing an image in response to an input signal, wherein the electron source comprises an electron-emitting device having an electron-emitting region between opposite electrodes, and the interior of the enclosure is maintained under an atmosphere effective to prevent structural changes of the electron-emitting device.

DETAILED DESCRIPTION OF THE PREFERRED EMBODIMENTS

As a result of intensive studies for long years, the inventors have accomplished the present invention based on findings that an emission current and a device current are changed mainly due to variations in the amount of organic materials present on the surface of a surface conduction electron-emitting device and in a vacuum atmosphere around the device, and that a stable electron-emitting characteristic is obtained without variations in the emission current and the device current by reducing a partial pressure of carbon compounds, particularly organic materials, to be as low as possible.

Preferred embodiments of the present invention will be illustrated below.

The present invention concerns with a novel structure and manufacture process of a surface conduction electron-emitting device, an electron source and an image-forming apparatus using the surface conduction electron-emitting device, as well as applications of the electron source and the image-forming apparatus.

A basic structure of the surface conduction electron-emitting devices is divided into the planar type and the vertical type.

Figure 1A:
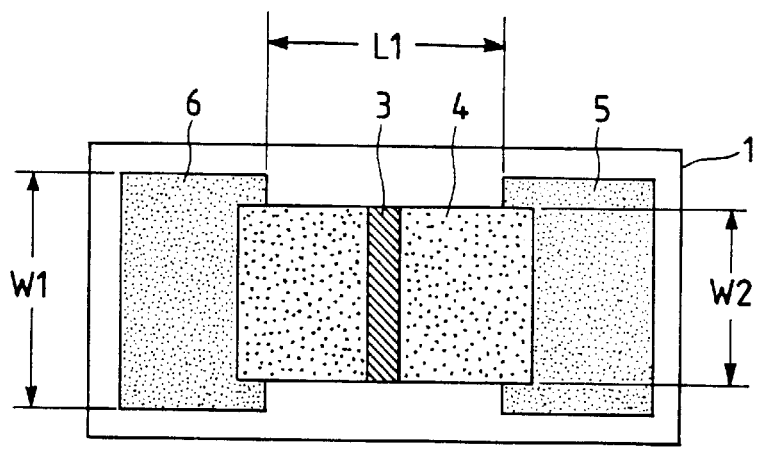
FIGS. 1A and 1B are schematic views of a planar type surface conduction electron-emitting device according to an embodiment of the present invention and Examples 1 to 3.
Figure 1B:
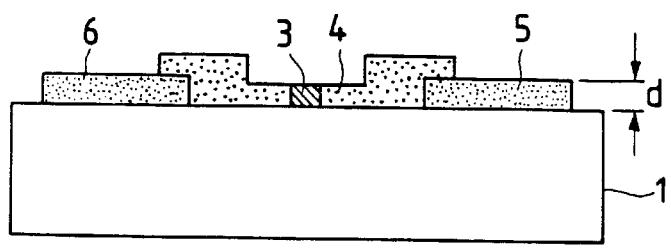

FIGS. 1A and 1B are a plan and sectional view, respectively, showing a basic structure of the surface conduction electron-emitting device according to the present invention. A description will now be made of the basic structure of the device according to the present invention.

In FIGS. 1A and 1B, denoted by reference numeral 1 is a substrate, 5 and 6 are device electrodes, 4 is an electron-emitting region including thin film, and 3 is an electron-emitting region.

The substrate 1 may be of, for example, a glass substrate made of, e.g., quartz glass, glass having a reduced content of impurities such as Na, soda lime glass and soda lime glass having $SiO_2$ laminated thereon by sputtering, or a ceramic substrate made of, e.g., alumina.

The device electrodes 5, 6 arranged in opposite relation may be made of any material which has conductivity. Examples of electrode materials are metals such as Ni, Cr, Au, Mo, W, Pt, Ti, Al, Cu and Pd or alloys thereof, printed conductors comprising metals such as Pd, Ag, Au, $RuO_2$ and Pd—Ag or oxides thereof, glass, etc., transparent conductors such as $In_2O_3$—$SnO_2$, and semiconductors such as polysilicon.

The distance L1 between the device electrodes is in the range of several hundreds angstroms to several hundreds microns, and is set depending on the photolithography technique as the basis for a manufacture process of the device electrodes, i.e., performance of an exposure machine and an etching method, and device factors such as the voltage applied between the device electrodes and the intensity of an electric field capable of emitting electrons. Preferably, the distance L1 is in the range of several microns to several tens microns.

The length W1 and the film thickness d of the device electrodes 5, 6 are appropriately designed in consideration of the resistance values of the electrodes, connection to X- and Y-direction wirings as mentioned before, the problem in the arrangement of numerous devices making up an entire electron source, etc. Usually, the length W1 of the device electrodes is in the range of several microns to several hundreds microns, and the film thickness d of the device electrodes 5, 6 is in the range of several hundreds angstroms to several microns.

The thin film 4 including electron-emitting region including which is positioned above and between the device electrodes 5, 6 disposed on the substrate 1 in opposite relation includes the electron-emitting region 3. The thin film 4 including electron-emitting region is not limited to the structure shown in FIG. 1B, and may not be positioned over both the device electrodes 5, 6. This case results when the electron-emitting region forming thin film 2 and the opposite device electrodes 5, 6 are laminated on the insulating substrate 1 in this order. Alternatively, the entire region between the opposite device electrodes 5, 6 may function as the electron-emitting region depending on the manufacture process. The thin film 4 including electron-emitting region has a thickness preferably in the range of several angstroms to several thousands angstroms, more preferably 10 angstroms to 500 angstroms. The film thickness is appropriately set in consideration of the step coverage over the device electrodes 5, 6, the resistance values between the electron-emitting region 3 and the device electrodes 5, 6, the grain size of conductive fine particles in the electron-emitting region 3, conditions of the energizing process (described later), etc. The thin film 4 including electron-emitting region has a sheet resistance value of $10^3$ to $10^7$ ohms/□.

Specific examples of materials of the thin film 4 including electron-emitting region are metals such as Pd, Ru, Ag, Au, Ti, In, Cu, Cr, Fe, Zn, Sn, Ta, W and Pb, oxides such as PdO, $SnO_2$, $In_2O_3$, PbO, $Sb_2O_3$, borides such as $HfB_2$, $ZrB_2$, $LaB_6$, $CeB_6$, $YB_4$ and $GdB_4$, carbides such as TiC, ZrC, HfC, TaC, SiC and WC, nitrides such as TiN, ZrN and HfN, semiconductors such as Si and Ge, carbon, AgMg, and NiCu. The thin film 4 is preferably a fine particle film in order to provide a good electron emission characteristic.

The term "fine particle film" used herein means a film comprising a number of fine particles aggregated together, and includes films having microstructures in which fine particles are not only individually dispersed, but also adjacent to or overlapped with each other (including an island state). The grain size of the fine particles is in the range of several angstroms to several thousands angstroms, preferably 10 angstroms to 200 angstroms.

The electron-emitting region 3 is made up of a number of conductive fine particles having the grain size preferably in the range of several angstroms to several thousands angstroms, more preferably 10 angstroms to 500 angstroms. The thickness of the electron-emitting region 3 depends on the thickness of the thin film 4 including electron-emitting region and the manufacture process including conditions of the energizing process (described later), and is set in an appropriate range. Materials of the electron-emitting region 3 are the same as a part or all of the materials of the thin film 4 including electron-emitting region for respective constituent elements of the latter.

Figure 6:
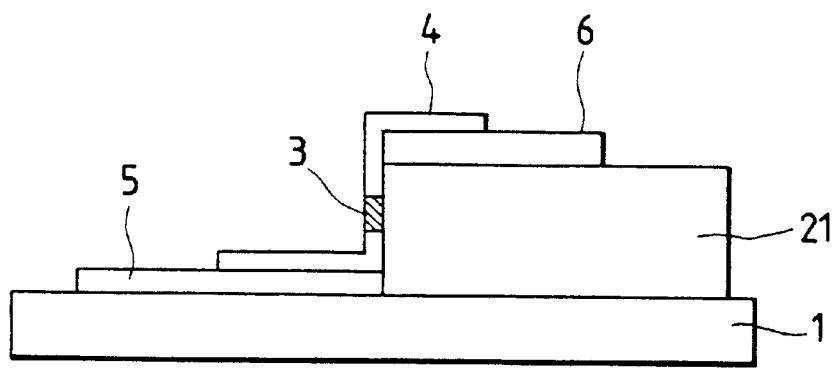
FIG. 6 is a schematic view of a vertical type surface conduction electron-emitting device according to an embodiment of the present invention.

A description will now be made of a vertical type surface conduction electron-emitting device as the other type of the surface conduction electron-emitting device of the present invention. FIG. 6 is a schematic view showing a basic structure of the vertical type surface conduction electron-emitting device according to the present invention.

In FIG. 6, the substrate 1, the device electrodes 5, 6, the thin film 4 including electron-emitting region including and the electron-emitting region 3 are each made of the same materials as used for the planar type surface conduction electron-emitting devices described above. A step-forming section 21 is formed of an insulating material such as $SiO_2$ by vacuum evaporation, printing, sputtering or the like. The thickness of the step-forming section 21 corresponds to the distance L1 between the device electrodes of the planar type surface conduction electron-emitting devices described above. Depending on the manufacture process of the step-forming section, the voltage applied between the device electrodes, and the intensity of an electric field capable of emitting electrons, the thickness of the step-forming section 21 is usually set to be in the range of several tens nanometers to several tens microns, preferably several tens nanometers to several microns.

Since the thin film 4 including electron-emitting region is formed after fabricating the device electrodes 5, 6 and the step-forming section 21, the thin film 4 is laminated on the device electrodes 5, 6. While the electron-emitting region 3 is shown as being linear in FIG. 6, the shape and position of the region 3 are not limited to the illustrated ones and depend on the manufacture conditions, the energizing conditions in the forming process, etc.

Figure 2A:
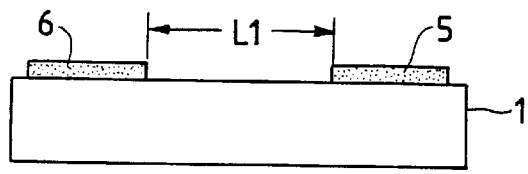
FIGS. 2A to 2C are sectional views showing successive steps of a process of manufacturing the surface conduction electron-emitting device according to the embodiment of the present invention and Examples 1 to 3.
Figure 2B:
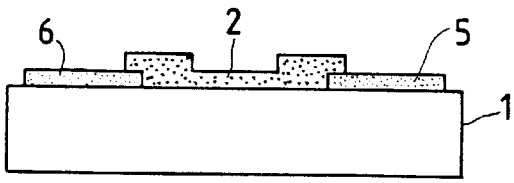
Figure 2C:
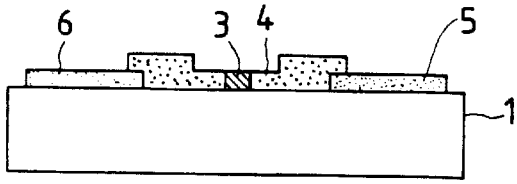

While the electron-emitting device containing the electron-emitting region can be manufactured in various ways, one example of the manufacture process is shown in FIGS. 2A to 2C. Note that reference numeral 2 in FIG. 2B denotes an electron-emitting region forming thin formed of a fine particle film, for example.

The manufacture process will be described below in sequence with reference to FIGS. 1A to 2C.

1) The insulating substrate 1 is sufficiently washed with a detergent, pure water and an organic solvent. A device electrode material is then deposited on the substrate 1 by vacuum evaporation, sputtering or any other suitable method. The device electrodes 5, 6 are then formed on the surface of the insulating substrate 1 by the photolithography technique (FIG. 2A).

2) Between the device electrodes 5, 6 provided on the insulating substrate 1, an organic metal thin film is formed by coating an organic metal solution over the insulating substrate 1 formed with the device electrodes 5, 6 and then leaving the coating to stand as it is. The organic metal solution is a solution of an organic compound containing, as a primary element, any of the above-cited metals such as Pd, Ru, Ag, Au, Ti, In, Cu, Cr, Fe, Zn, Sn, Ta, W and Pb. After that, the organic metal thin film is heated for baking and patterned by lift-off or etching to thereby form the electron-emitting region forming thin film 2 (FIG. 2B). While the organic metal thin film is formed by coating the organic metal solution herein, the forming method is not limited to the coating, and the organic metal thin film may be formed by any of other methods such as vacuum evaporation, sputtering, chemical vapor-phase deposition, dispersion coating, dipping and spinning.

3) Subsequently, the energizing process called forming is carried out by applying a pulse-like voltage between the device electrode 5 and 6 from a power supply (not shown). The electron-emitting region-forming thin film 2 is thereby locally changed in its structure so as to form the electron-emitting region 3 (FIG. 2C). A portion of the electron-emitting region forming thin film 2 where the structure is locally destroyed, deformed or denatured by the energizing process will be referred to as the electron-emitting region 3. As previously described, the inventors have found by observing the electron-emitting region 3 that the region 3 is made up of conductive fine particles.

Figure 3:
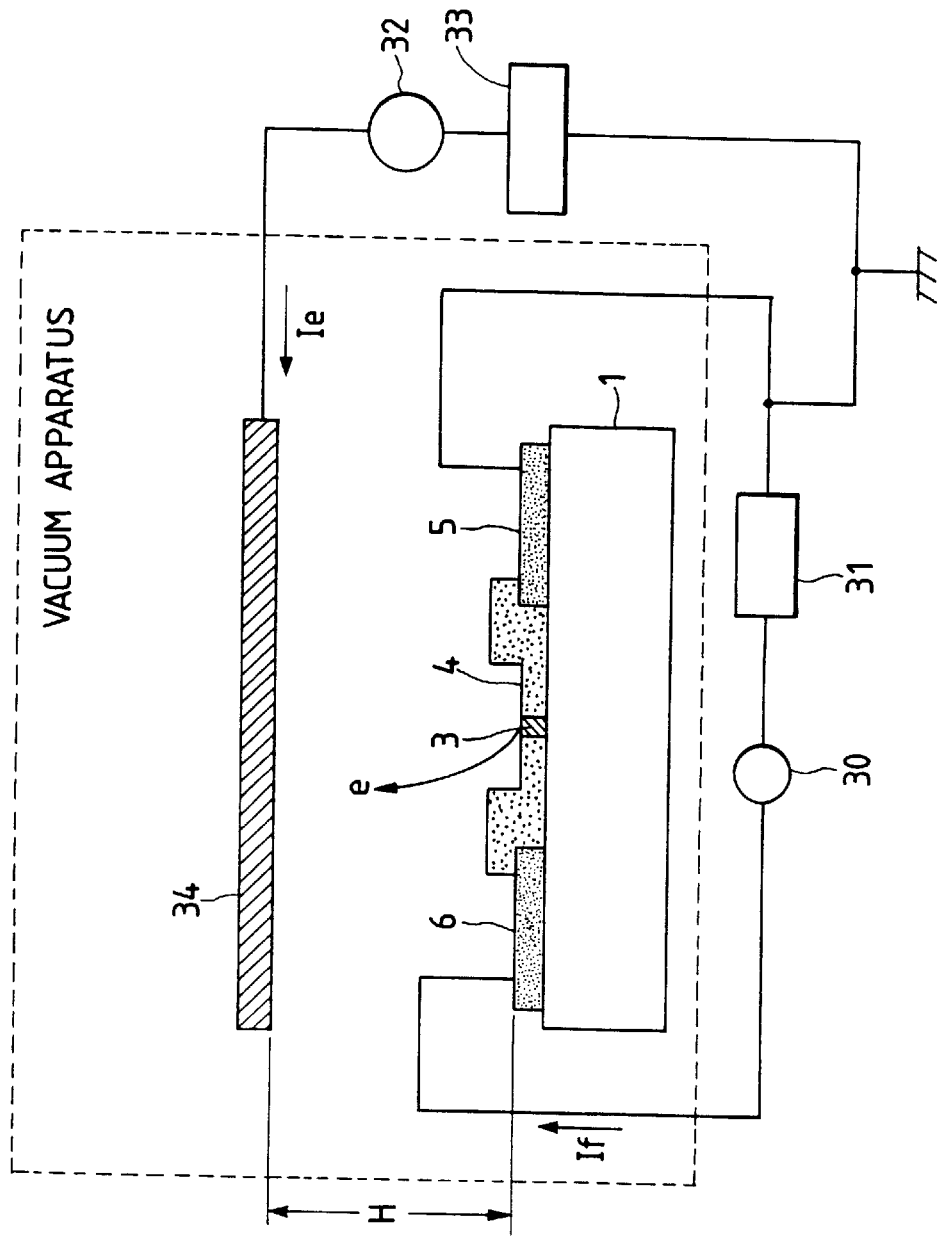
FIG. 3 is a schematic view of a measuring apparatus for use in the present invention.

Electrical processes such as the forming operation or the activation operation are carried out in a measuring (evaluating) apparatus shown in FIG. 3. The measuring apparatus will be described below.

FIG. 3 is a schematic view of the measuring apparatus for measuring electron emission characteristics of the device constructed as shown in FIGS. 1A and 1B. In FIG. 3, denoted by 1 is a substrate, 5 and 6 are device electrodes, 4 is a thin film including electron-emitting region, and 3 is an electron-emitting region. Further, 31 is a power supply for applying a device voltage Vf to the device, 30 is an ammeter for measuring a device current If flowing through the thin film 4 including electron-emitting region between the device electrodes 5 and 6, 34 is an anode electrode for capturing an emission current Ie emitted from the electron-emitting region 3 of the device, 33 is a high-voltage power supply for applying a voltage to the anode electrode 34, and 32 is an ammeter for measuring the emission current Ie emitted from the electron-emitting region 3 of the device.

For measuring the device current If and the emission current Ie of the electron-emitting device, the power supply 31 and the ammeter 30 are connected to the device electrodes 5, 6, and the anode electrode 34 connected to the power supply 33 and the ammeter 32 is disposed above the electron-emitting device. The electron-emitting device and the anode electrode 34 are disposed in a vacuum apparatus which is provided with additional necessary units (not shown) such as an evacuation pump and a vacuum gauge, so that the device is measured and evaluated under a desired vacuum. The evacuation pump includes a normal high vacuum apparatus system comprising a turbo pump and a rotary pump, and a ultra-high vacuum apparatus system comprising a sorption pump and an ion pump that employs no oil for evacuation, these two systems being selectively switched over. Further, a quadruple mass spectrometer (not shown) is installed for measuring residual gas in the vacuum apparatus. The entire vacuum apparatus and the electron source substrate can be heated up to 200° C. by a heater (not shown).

The measurement is usually performed by setting the voltage applied to the anode electrode to be in the range of 1 kV to 10 kV, and the distance H between the anode electrode and the electron-emitting device to be in the range of 2 mm to 8 mm.

The forming process is carried out by applying a voltage pulse with its pulse crest value held constant, or a voltage pulse with its pulse crest value increased. The voltage waveform used in the case of applying a voltage pulse with its pulse crest value held constant is shown in FIG. 4A.

Figure 4A:
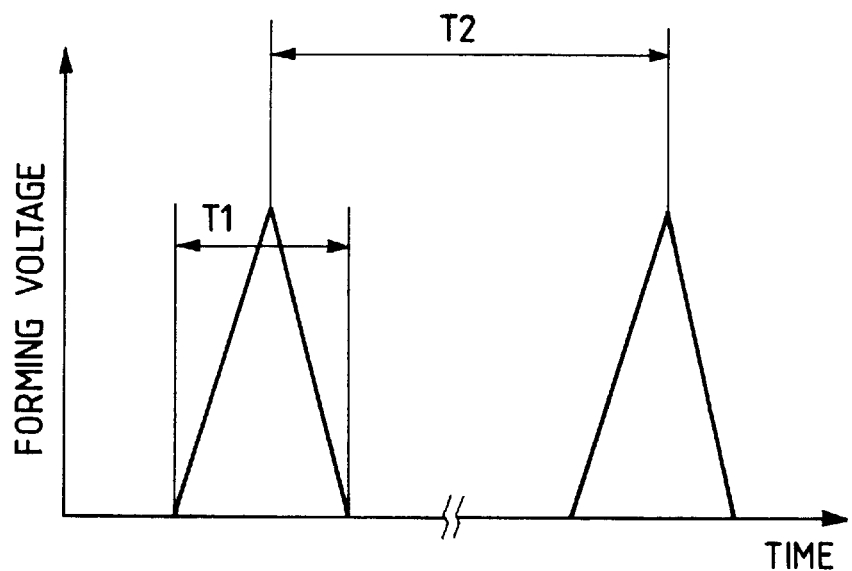
FIGS. 4A and 4B are charts showing forming waveforms.

In FIG. 4A. T1 and T2 indicate a pulse width and interval of the voltage waveform, and are set to be in the range of 1 microsecond to 10 milliseconds and 10 microseconds to 100 milliseconds, respectively. The crest value of the triangular wave (i.e., the peak value during the forming) is appropriately selected. The forming process is performed under a vacuum atmosphere on the order of $10^{-5}$ Torr to $10^{-6}$ Torr.

Figure 4B:
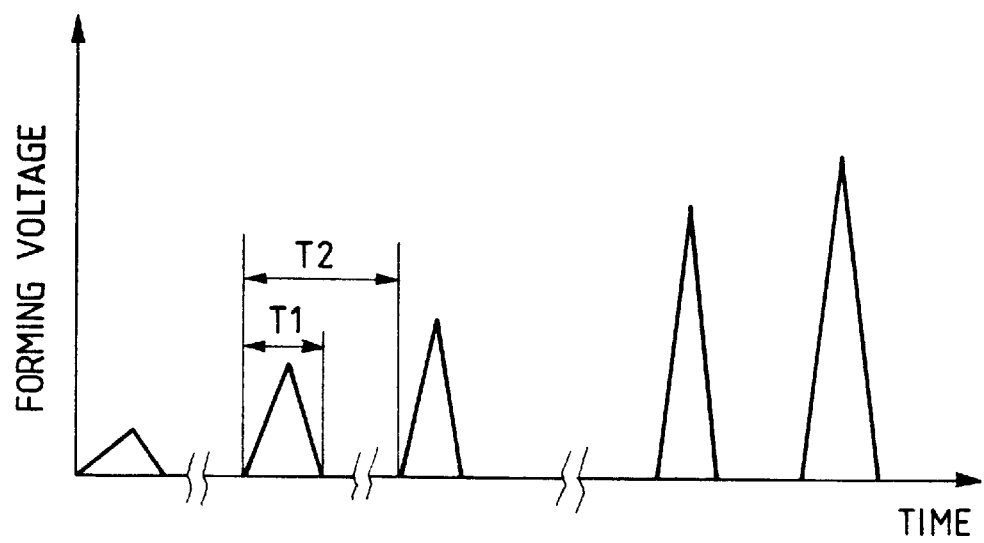

The voltage waveform used in the case of applying a voltage pulse with its pulse crest value increased is shown in FIG. 4B.

In FIG. 4B, T1 and T2 indicate a pulse width and interval of the voltage waveform, and are set to be in the range of 1 microsecond to 10 milliseconds and 10 microseconds to 100 milliseconds, respectively. The crest value of the triangular wave (i.e., the peak value during the forming) is raised in steps of 0.1 V, for example. The forming process is performed under a vacuum atmosphere.

The forming process is ended at the time a resistance value exceeds 1 M ohms, for example, as a result of applying such a voltage of, e.g., about 0.1 V, as not to locally destroy or deform the electron-emitting region forming thin film 2 and measuring the device current during the pulse interval T2, or after the voltage is further increased up to the driving voltage which is applied to actually emit electrons from the device. The forming process may be ended in either way. In this connection, the voltage at which the resistance value exceeds 1 M ohms will be referred to as a forming voltage Vform.

While the forming process is carried out by applying a triangular pulse between the device electrodes in the above-described step of forming the electron-emitting region, the pulse applied between the device electrodes is not limited to the triangular waveform, but may have any other desired waveform such as rectangular one. The crest value, width and interval of the pulse are also not limited to the aforementioned values, but may be selected to have desired values depending on the resistance value of the electron-emitting device, etc. so that the electron-emitting region is formed satisfactorily.

4) After the forming process, the device is preferably subjected to a so-called activating process. The activating process means a process in which a pulse having a crest value of constant voltage is repeatedly applied to the device as with the forming process, but under a vacuum at a degree of, e.g., about $10^{-4}$ to $10^{-5}$ Torr. With the activating process, carbon and/or carbon compounds are deposited from organic materials present in the vacuum so that the device current If and the emission current Ie are significantly changed.

Figure 5:
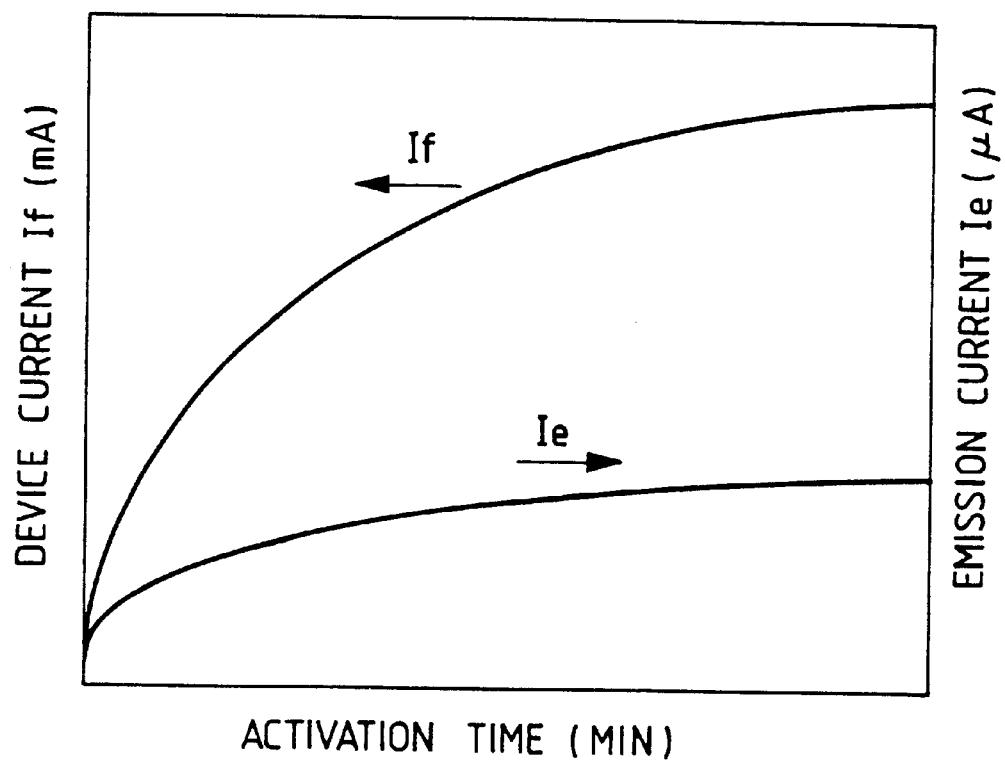
FIG. 5 is a graph showing dependency of a device current and an emission current upon an activating process time.

Practically, the activating process is performed while measuring the device current If and the emission current Ie, and is ended at the time the emission current Ie is saturated. FIG. 5 shows examples of dependency of the device current If and the emission current Ie upon an activating process time.

As a result of the activating process, the dependency of the device current If and the emission current Ie upon time and the condition of a coating film formed near the thin film which has been deformed and denatured by the forming process, are changed depending upon the degree of vacuum, the pulse voltage applied to the device, etc.

The voltage applied in the activating process is usually set to a higher voltage as the crest value than the forming voltage Vform. It is set to, for example, a value near the voltage that is applied to actually drive the device.

Observing the surface condition of the device after the activating process by FESEM and TEM showed that carbon and carbon compounds were deposited over a part of and around the region 3 which has been deformed and denatured by the forming process. Observation at a higher magnification showed that carbon and/or carbon compounds were also deposited on and around fine particles. Further, depending on the distance between the opposite device electrodes, carbon and carbon compounds were deposited on the device electrodes in some cases. A thickness of the deposit film is preferably not larger than 500 angstroms, more preferably not larger than 300 angstroms.

The carbon and/or carbon compounds deposited during the activating process are identified as graphite (including the single-crystal and polycrystalline forms) and amorphous carbon (including a mixture of amorphous carbon and polycrystalline graphite) as a result of analysis using TEM and a Raman spectrophotometer.

It is to be noted that when the applied voltage is raised up to near the driving voltage in the forming process, the activating process can be dispensed with.

5) The electron-forming device thus fabricated is driven under a vacuum atmosphere at a higher degree than that in the forming process and the activating process. Here, the vacuum atmosphere at a higher degree than that in the forming process and the activating process means a vacuum atmosphere at a degree not lower than about $10^{-6}$ Torr, preferably a ultra-high vacuum atmosphere at such a degree that carbon and/or carbon compounds are not newly deposited in an appreciable amount.

Accordingly, further deposition of carbon and/or carbon compounds can be so suppressed that the device current If and the emission current Ie are stabilized to a constant level.

Basic characteristics of the electron-emitting device according to the present invention, which is structured and manufactured as described above, will be described below with reference to FIG. 7.

Figure 7:
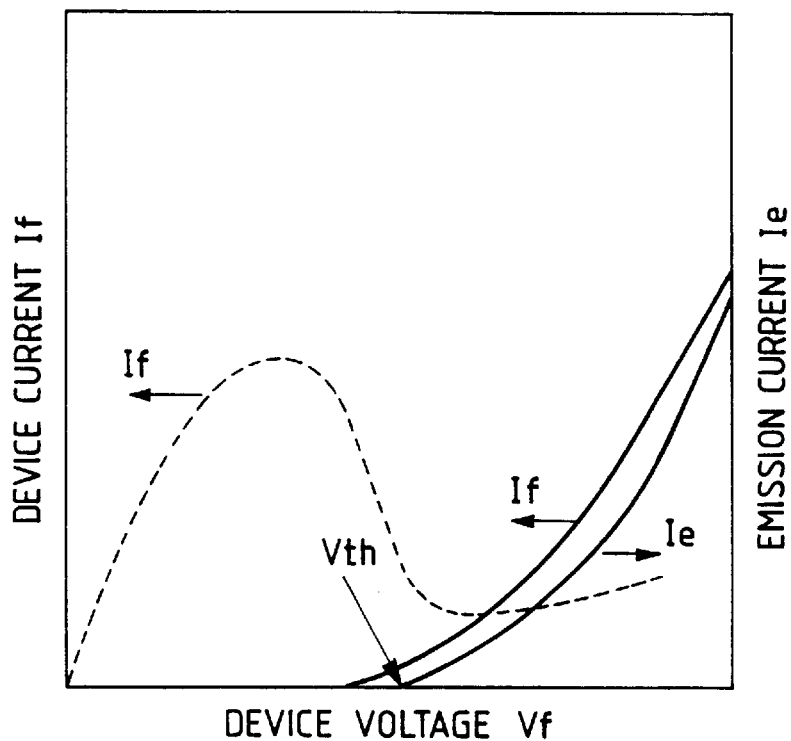
FIG. 7 is a graph showing typical I-V characteristics under a vacuum at degree of about $1 \times 10^{-6}$ Torr.

FIG. 7 shows typical examples of the relationship between the emission current Ie and the device current If and the device voltage Vf measured in a voltage range for normal operation by the measuring apparatus shown in FIG. 3. Note that the graph of FIG. 7 is plotted in arbitrary units because the emission current Ie is much smaller than the device current If. As will be apparent from FIG. 7, the present electron-emitting device has three characteristics with respect to the emission current Ie.

First, the emission current Ie is abruptly increased when the device voltage applied is greater than a certain value (called a threshold voltage, Vth in FIG. 7), but it is not appreciably detected below the threshold voltage Vth. Thus, the present device is a non-linear device having the definite threshold voltage Vth for the emission current Ie.

Secondly, the emission current Ie depends upon the device voltage Vf and, therefore, the emission current Ie can be controlled by the device voltage Vf.

Thirdly, emitted charges captured by the anode electrode 34 depends upon the time during which the device voltage Vf is applied. Thus, the amount of the charges captured by the anode electrode 34 can be controlled with the time during which the device voltage Vf is applied.

On the other hand, the device current If exhibits a characteristic (called MI characteristic) that it increases monotonously with respect to the device voltage Vf (as indicated by a solid line in FIG. 7), or a voltage controlled negative resistance characteristic (called VCNR characteristic) with respect to the device voltage Vf. These characteristics of the device current depend upon the manufacture process, the measuring conditions, etc. The boundary voltage above which the VCNR characteristic is exhibited is given as Vp. More specifically, it has been found that the VCNR characteristic of the device current If is exhibited when the device is subjected to the forming process in a normal vacuum apparatus system, and is greatly changed depending on not only electrical conditions in the forming process and vacuum atmosphere conditions in the vacuum apparatus system, but also vacuum atmosphere conditions in a vacuum apparatus system used for measuring the electron-emitting device having been subjected to the forming process, electrical measuring conditions (e.g., a sweep rate at which the voltage applied to the device is swept from a low value to a high value to obtain a current-voltage characteristic of the electron-emitting device), and the period of time during which the electron-emitting device is left to stand in the vacuum apparatus). When the device current exhibits the VCNR characteristic, the emission current Ie also shows the MI characteristic.

The monotonously increasing characteristic of the device current If has been observed so far when the voltage applied to the device is swept relatively fast from a low value to a high value in the case of subjecting the device to the forming process in a normal vacuum apparatus system, as described in Japanese Patent Application Laid-Open No. 1-279542, for example. However, as the resultant current values are different from values of the device current If and the emission current Ie of the device having been subjected to the forming process in the ultra-high vacuum system, it is presumed that the device condition is different between both the cases.

Characteristics of the conventional surface conduction electron-emitting device will be described below. The electron-emitting device is usually driven after evacuating a vacuum apparatus to a vacuum degree of about $1 \times 10^{-5}$ Torr by using evacuation apparatus such as a rotary pump and a turbo pump.

Figure 26:
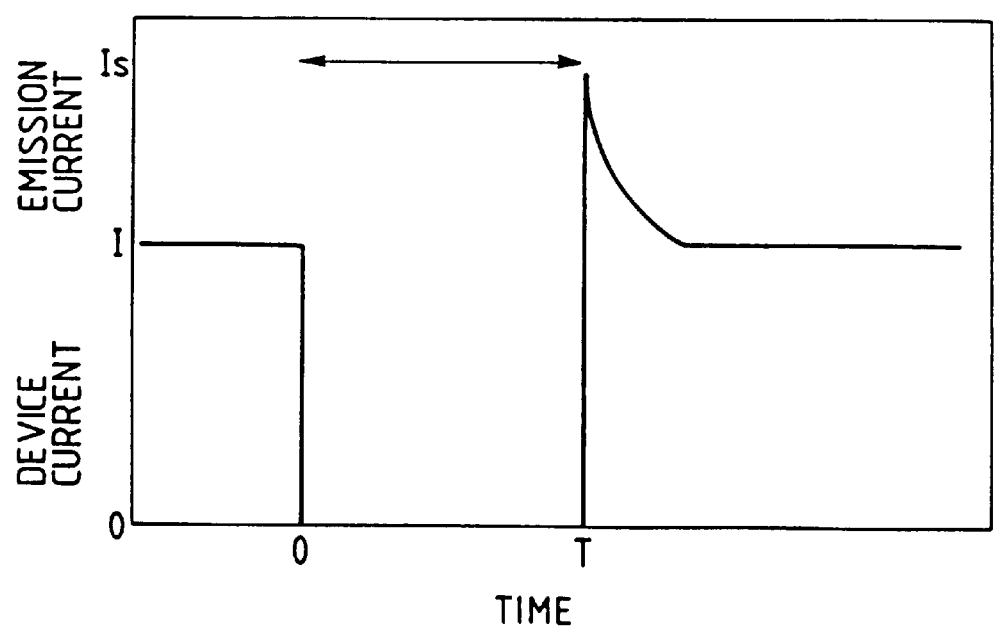
FIG. 26 is a graph showing variations in an emission current depending upon a standing time in the conventional surface conduction electron-emitting device.

FIG. 26 graphically shows changes in the emission current Ie and the device current If depending on the standing time (this characteristic being referred to as "standing time dependent variations") resulted when the conventional electron-emitting device is left not driven. Though being different in absolute values, the emission current and the device current are varied substantially in a similar fashion.

As will be apparent from FIG. 26, the emission current and the device current are each temporarily increased after the standing time T, and are then returned to the value before the standing after a time constant of several seconds to several minutes. The amount of the temporary increase (Is−I) depends upon various conditions such as the standing time, the vacuum degree, the residual gas present in the vacuum, and the device driving voltage, and may be as large as about 50%. Usually, the amount of electrons emitted from the electron-emitting device is changed and modulated by changing a width or voltage value of the voltage applied to the device.

Figure 27:
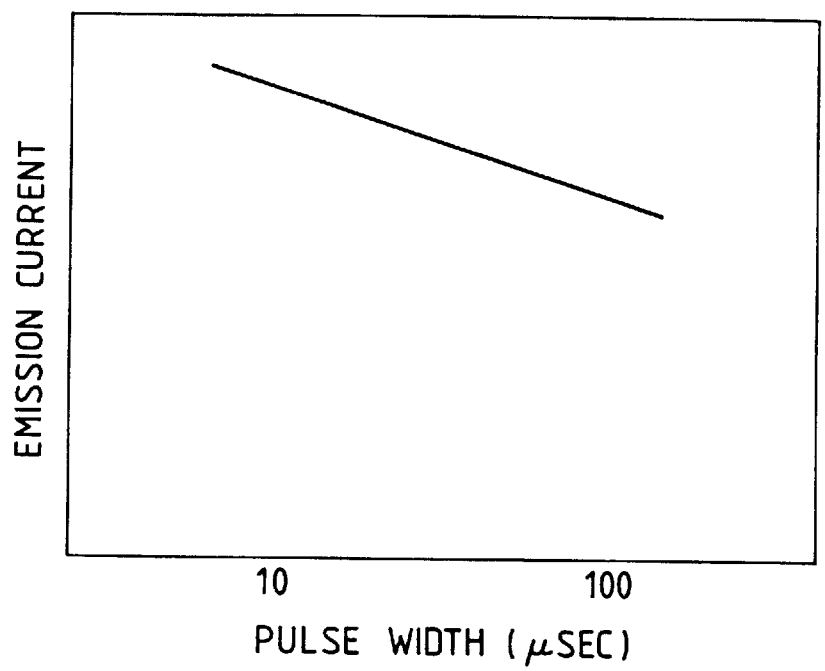
FIG. 27 is a graph showing variations in an emission current depending upon a pulse width in the conventional surface conduction electron-emitting device.

FIG. 27 graphically shows the relationship between an emission current and a pulse width in the conventional surface conduction electron-emitting device. As will be apparent from FIG. 27, the emission current is increased as the pulse width is narrowed. In the conventional surface conduction electron-emitting device, therefore, the amount of electrons emitted is not proportional to the pulse width and hence is hard to be controlled therewith. (This characteristic is referred to as "pulse width dependent variations").

Figure 28:
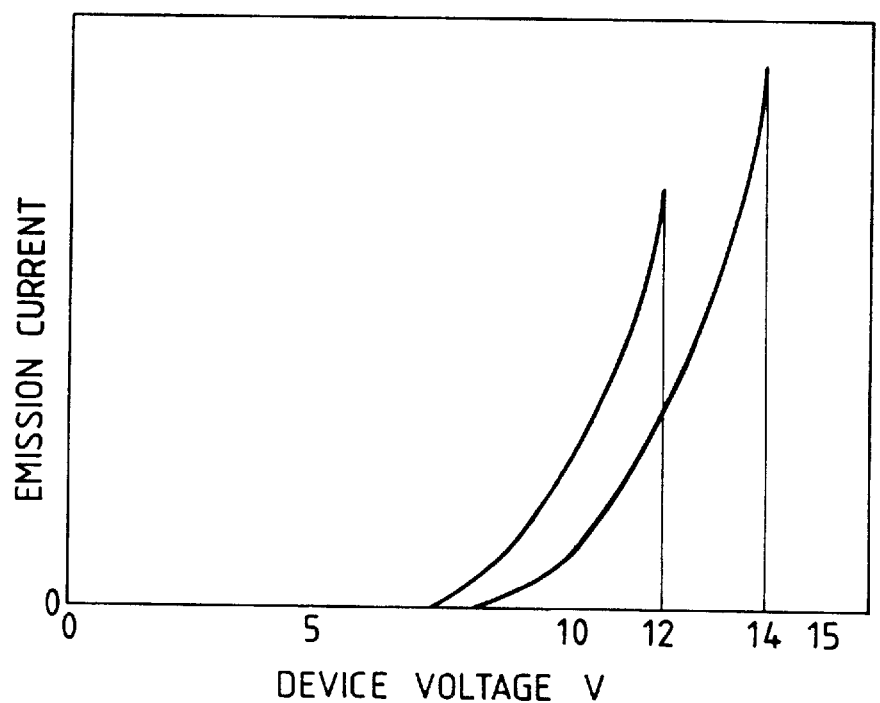
FIG. 28 is a graph showing a characteristic of emission current versus device voltage (i.e., variations in an emission current depending upon a device voltage) in the conventional surface conduction electron-emitting device.

FIG. 28 graphically shows the relationship between an emission current and a device voltage in the conventional surface conduction electron-emitting device. The illustrated characteristic of emission current versus device voltage (i.e., Ie−Vf characteristic) is obtained by continuously applying a triangular voltage with a pulse width not greater than 100 milliseconds to the device until the emission current is saturated. In FIG. 28, there are shown an Ie−Vf characteristic that resulted when applying a voltage of 14 V to the device until the emission current is saturated, and an Ie−Vf characteristic that resulted when applying a voltage of 12 V to the device until the emission current is saturated.

As will be apparent from FIG. 28, the characteristic of emission current versus device voltage is varied depending on the device voltage and hence is hard to be controlled therewith. Such variations are equally applied to the device current. (This characteristic is referred to as device voltage dependent variations").

The present invention has been made in view of the above conventional characteristics. In other words, the inventors have first found that the emission current Ie and the device current If are changed due to variations in the amount of organic materials present on the surface of the electron-emitting device and in the vacuum atmosphere around the device, and that the emission current Ie and the device current If are substantially uniquely determined with respect to the device voltage without variations by reducing a partial pressure of organic materials to be as low as possible, and they exhibit a monotonously increasing (MI) characteristic in a voltage range for normal operation. Herein, the vacuum atmosphere is equivalent to an atmosphere in an enclosure (or a vacuum apparatus) for maintaining a vacuum therein. It has also been found that the variations in the emission current and the device current depend upon the manufacture process of the device. Further, the voltage range for normal operation is set depending on the materials, structure and other properties of the electron-emitting device, and means a range in which the electron-emitting device is not destroyed by an electric field, heat, etc.

Thus, the inventors have found that when the electron-emitting device having various kinds of instability when operated in the normal vacuum apparatus is operated in the vacuum apparatus evacuated by the ultra-high vacuum system, it exhibits electron-emitting characteristics with very small amounts of the above standing time dependent variations, pulse width dependent variations and device voltage dependent variations, and that the device current of the electron-emitting device is hardly affected by the measuring conditions, such as the voltage sweeping rate, unlike the electron-emitting device disclosed in the above-cited Japanese Patent Application Laid-Open No. 1-279542.

As a result of studying the causes of variations in the characteristics by a mass spectrometer, the partial pressure of organic materials in the vacuum apparatus is preferably not greater than $1 \times 10^{-8}$ Torr, more preferably not greater than $1 \times 10^{-10}$ Torr. Also, pressure in the vacuum apparatus is preferably not greater than $5 \times 10^{-6}$ Torr, more preferably not greater than $1 \times 10^{-7}$ Torr, most preferably not greater than $1 \times 10^{-8}$ Torr. The vacuum evacuation apparatus for evacuating the vacuum apparatus is desirably of the type employing no oil so that the device characteristics will not be affected by oil generating from the apparatus. Practically suitable vacuum evacuation apparatus include, e.g., a sorption pump and an ion pump. When evacuating the vacuum apparatus by the ultra-high vacuum evacuation system, it is especially desirable to carry out the evacuation while heating the electron-emitting device and the vacuum apparatus, because organic materials adsorbed on the device surface and the vacuum apparatus are easily evacuated. The heating conditions are desirably set to be in the temperature range of 80° C. to 200° C. for 5 hours or more, but are not limited to these values. The partial pressure of organic materials are determined by measuring partial pressures of organic molecules which mainly consist of carbon and hydrogen and have a mass of 10 to 200 as a result of analysis using a mass spectrometer, and then adding up the measured partial pressures.

Figure 8:
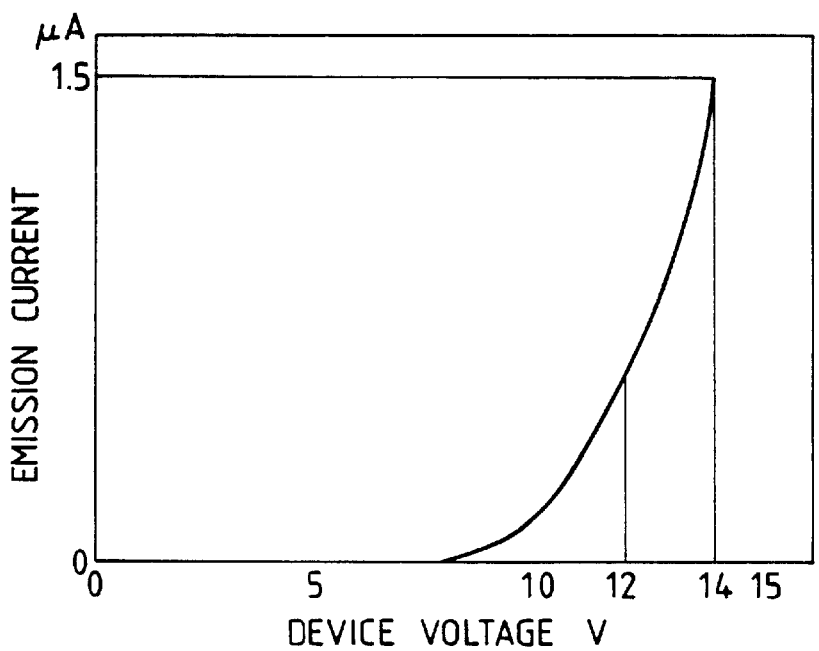
FIG. 8 is a graph showing a characteristic of emission current versus device voltage (I-V characteristic) in the surface conduction electron-emitting device according to the present invention.

FIG. 8 shows the relationship between an emission current and a device voltage in the surface conduction electron-emitting device of the present invention described above.

As will be apparent from FIG. 8, the emission current has a monotonously increasing (MI) characteristic that is substantially uniquely determined with respect to the device voltage.

The above-described various kinds of instability in the conventional electron-emitting device are though as being attributable to that microstructures of graphite and amorphous carbon observed in the electron-emitting region after fabrication of the device are changed by organic molecules present in trace amounts, or that organic molecules and denatured substances thereof are adsorbed on the electron-emitting region in such a manner as to affect the electron emitting characteristics. It is hence believed that the electron-emitting device having very stable characteristics is obtained by removing those organic materials which have been responsible for the characteristic variations.

The above-described causes of the characteristic variations are not limited to organic materials, and the similar characteristic variations may be caused by any carbon compounds.

As fully described above, the electron-emitting device of the present invention is a very stable electron-emitting device of which electron emission characteristic is scarcely varied depending upon the standing time and the vacuum atmosphere. Also, the electron-emitting device of the present invention is an electron-emitting device which is easy to control the amount of electrons emitted because its electron emission characteristic is not varied depending upon the pulse width and the voltage value of waveform of the driving voltage (device voltage).

While the basic structures and manufacture process of the surface conduction electron-emitting device have been described above, the present invention is not limited to the above embodiments in accordance with the spirit of the invention, and any other surface conduction electron-emitting devices which have the above-described three basic characteristics, particularly in which the emission current has a feature of exhibiting a monotonously increasing characteristic uniquely determined with respect to the device voltage, are also applicable to electron sources and image-forming apparatus such as display devices (described later).

An electron source and an image-forming apparatus of the present invention will be described below.

An electron source or an image-forming apparatus can be made up by arraying a number of surface conduction electron-emitting devices of the present invention on a substrate. The electron-emitting devices can be arrayed on a substrate by several methods. By one method, as described before in connection with the prior art, the numerous surface conduction electron-emitting devices are arrayed in parallel (in a row direction) and interconnected at both ends of thereof by wirings to form a row of the electron-emitting devices, this row of electron-emitting devices being arranged in a large number, and control electrodes (called grids) are disposed in a space above the electron source to lie in a direction (called a column direction) perpendicular to the row-direction wirings, by controlling driving of the devices. By another method described below, n lines of Y-direction wirings are disposed over m lines of X-direction wirings with an interlayer insulating layer between, and the X-direction wirings and the Y-direction wirings are connected to respective pairs of device electrodes of the surface conduction electron-emitting devices. The latter case will be hereinafter referred to as a simple matrix array. A description will now be made of the simple matrix array in detail.

With the above-described three features in basic characteristics of the surface conduction electron-emitting device according to the present invention, electrons emitted from each of the surface conduction electron-emitting devices in the simple matrix array are also controlled depending on the crest value and width of a pulse-like voltage applied between the opposite device electrodes when the applied voltage is higher than the threshold value. On the other hand, almost no electrons are emitted at the voltage lower than the threshold value. Based on these characteristics, even when a number of electron-emitting devices are arranged into an array, it is possible to select any desired one of the surface conduction electron-emitting devices and to control the amount of electrons emitted therefrom in response to an input signal by properly applying the pulse-like voltage to each corresponding device.

The structure of an electron source substrate 81 arranged in accordance with the above principle will be described below with reference to FIG. 9 which shows a common embodiment. Denoted by 81 is an electron source substrate, 82 is an X-direction wiring, 83 is a Y-direction wiring, 84 is a surface conduction electron-emitting device, and 85 is a connecting lead. The surface conduction electron-emitting device 84 may be of either the planar or vertical type.

Figure 9:
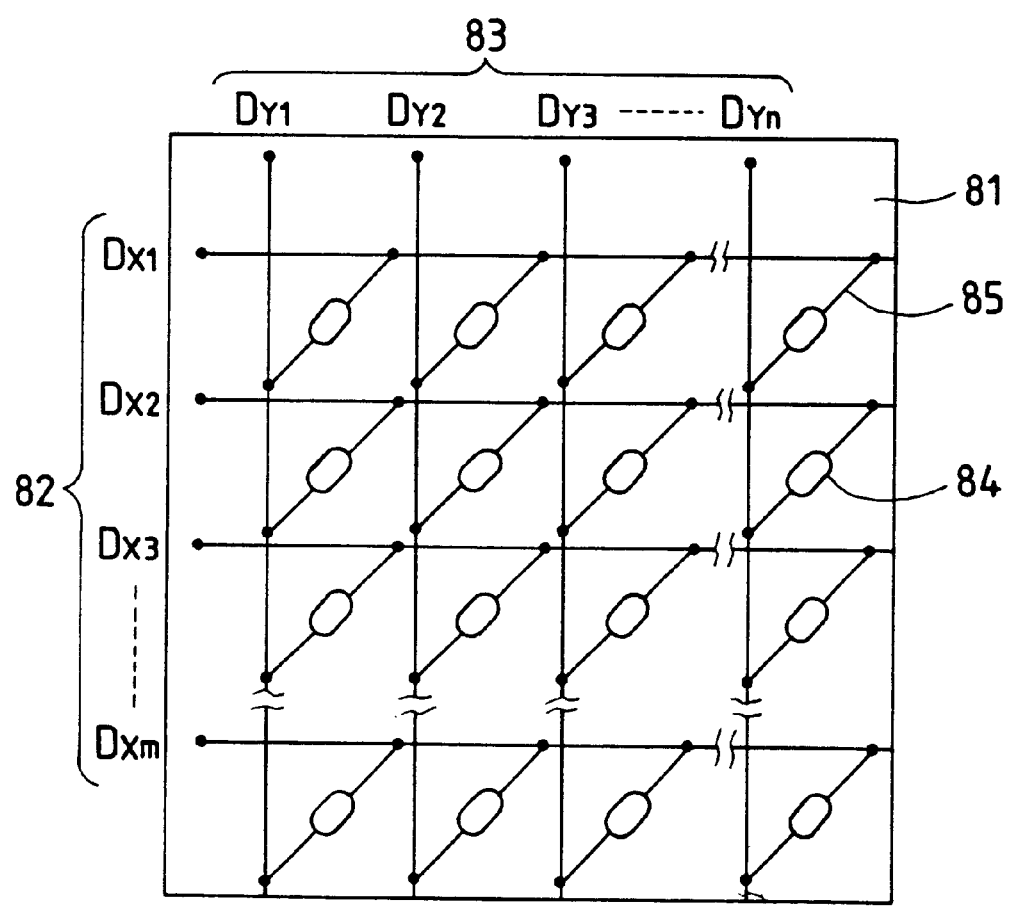
FIG. 9 is a schematic view of an electron source substrate, the view showing a simple matrix array according to an embodiment of the present invention and Example 4.

In FIG. 9, the electron source substrate 81 is of a glass substrate or the like as previously described. The number of surface conduction electron-emitting devices 84 to be arrayed and the shape of each device in design are appropriately set depending on the application.

Then, m lines of X-direction wirings 82, indicated by DX1, DX2, . . . , DXm, are made of conductive metal or the like and are formed in a desired pattern on the insulating substrate 81 by vacuum evaporation, printing, sputtering or the like. The material, film thickness and width of the wirings 82 are set so that a voltage as uniform as possible is supplied to all of the numerous surface conduction electron-emitting devices. Also, n lines of Y-direction wirings 83, indicated by DY1, DY2, . . . , DYn, are made of conductive metal or the like and are formed in a desired pattern on the insulating substrate 81 by vacuum evaporation, printing, sputtering or the like, as with the X-direction wirings 83. The material, film thickness and width of the wirings 83 are also set so that a voltage as uniform as possible is supplied to all of the numerous surface conduction electron-emitting devices. An interlayer insulating layer (not shown) is interposed between the m lines of X-direction wirings 82 and the n lines of Y-direction wirings 83 to electrically isolate the wirings 82, 83 from each other, thereby making up a matrix wiring. (Note that m, n are each a positive integer).

The not-shown interlayer insulating layer is made of $SiO_2$ or the like which is formed by vacuum evaporation, printing, sputtering or the like into a desired shape so as to cover the entire or partial surface of the insulating substrate 81 on which the X-direction wirings 82 have been formed. The thickness, material and fabrication process of the interlayer insulating layer is appropriately set so as to endure the potential difference in portions where the m lines of X-direction wirings 82 and the n lines of Y-direction wirings 83 are crossed each other. The X-direction wirings 82 and the Y-direction wirings 83 are led out to provide external terminals.

Further, similarly to the wirings, respective opposite electrodes (not shown) of the surface conduction electron-emitting devices 84 are electrically connected to the m lines of X-direction wirings 82 (DX1, DX2, ..., DXm) and the n lines of Y-direction wirings 83 (DY1, DY2, ..., DYn) by the connecting leads 85 which are made of conductive metal or the like and formed by vacuum evaporation, printing, sputtering or the like.

The conductive metals or other materials used for the m lines of X-direction wirings 82, the n lines of Y-direction wirings 83, the connecting leads 85 and the opposite device electrodes may be the same as a part or all of the constituent elements, or may be different from one another. Specifically, those materials are selected, as desired, from metals such as Ni, Cr, Au, Mo, W, Pt, Ti, Al, Cu and Pd or alloys thereof, printing conductors comprising metals such as Pd, Ag, Au, $RuO_2$ and Pd—Ag or oxides thereof, glass, etc., transparent conductors such as $In_2O_3$—$SnO_2$, and semiconductors such as polysilicon. Incidentally, the surface conduction electron-emitting devices may be formed on either the insulating substrate 81 or the interlayer insulating layer (not shown).

Though described later in detail, the X-direction wirings 82 are electrically connected to a scan signal generator (not shown) for applying a scan signal to scan each row of the surface conduction electron-emitting devices 84, which are arrayed in the X-direction, in response to an input signal.

On the other hand, the Y-direction wirings 83 are electrically connected to a modulation signal generator (not shown) for applying a modulation signal to modulate each column of the surface conduction electron-emitting devices 84, which are arrayed in the Y-direction, in response to an input signal.

Additionally, a driving voltage applied to each of the surface conduction electron-emitting devices is supplied as a differential voltage between the scan signal and the modulation signal both applied to that device.

Figure 10:
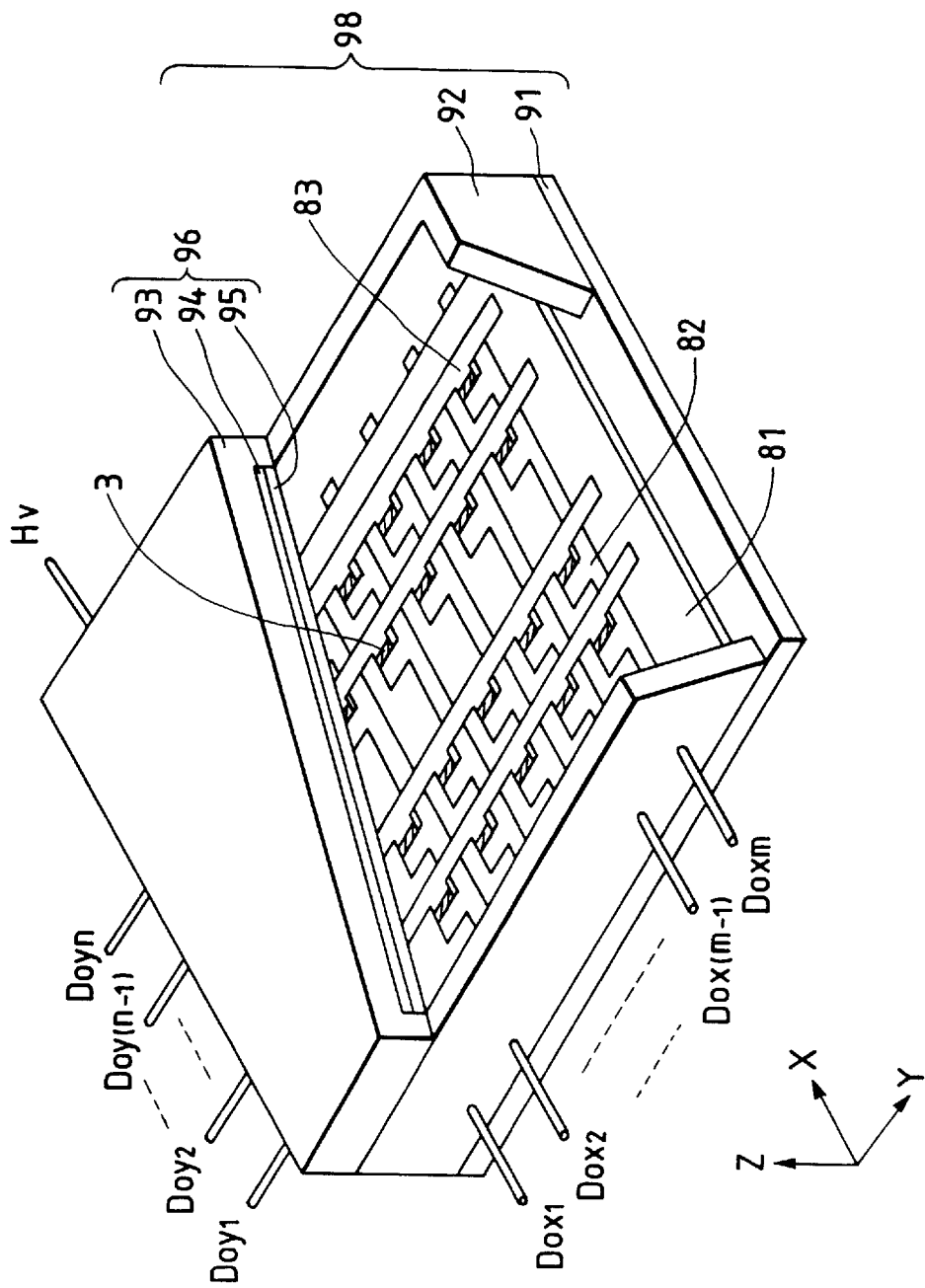
FIG. 10 is a schematic view of an image-forming apparatus according to an embodiment of the present invention and Example 4.

A description will now be made, with reference to FIG. 10 and FIGS. 11A and 11B, of an image-forming apparatus in which the electron source manufactured as above is employed for display and other purposes. FIG. 10 shows a basic structure of the image-forming apparatus, and FIGS. 11A and 11B each show a fluorescent film.

In FIG. 10, denoted by 81 is the electron source substrate on which a number of surface conduction electron-emitting devices are manufactured as above, 91 is a rear plate to which the electron source substrate 81 is fixed, 96 is a face plate fabricated by laminating a fluorescent film 94 and a metal back 95 on an inner surface of a glass substrate 93, and 92 is a support frame. After applying frit glass or the like to joined portions between the rear plate 91, the support frame 92 and the face plate 96, the assembly is baked in the atmosphere or nitrogen gas at 400° C. to 500° C. for 10 minutes or more to bond the joined portions, thereby making up an enclosure 98.

In FIG. 10, reference numeral 3 represents the electron-emitting region in FIGS. 1A and 1B and 82, 83 represent X- and Y-direction wirings connected to respective pairs of device electrodes of surface conduction electron-emitting devices. Note that the wirings connected to the device electrodes are also called device electrodes when the wirings are made of the same materials as the device electrodes.

The enclosure 98 is made up by the face plate 96, the support frame 92 and the rear plate 91 in the illustrated embodiment. However, since the rear plate 91 is provided for the purpose of mainly reinforcing the strength of the substrate 81, the separate rear plate 91 can be dispensed with when the substrate 81 itself has a sufficient degree of strength. In this case, the support frame 92 may be directly joined and bonded to the substrate 81, thereby making up the enclosure 98 by the face plate 96, the support frame 92 and the substrate 81. Alternatively, a not-shown support called spacer may be disposed between the face plate 96 and the rear plate 91 so that the enclosure 98 has a sufficient degree of strength against the atmospheric pressure.

Figure 11A:
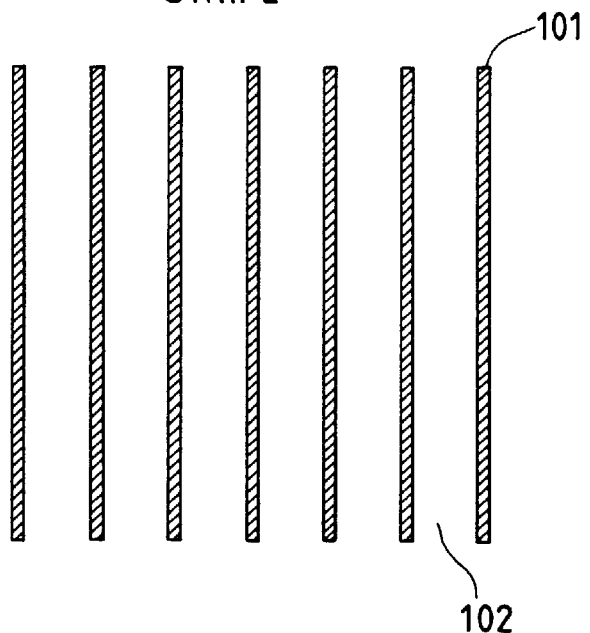
FIGS. 11A and 11B are explanatory views of fluorescent films in the image-forming apparatus according to the embodiment of the present invention and Example 4.
Figure 11B:
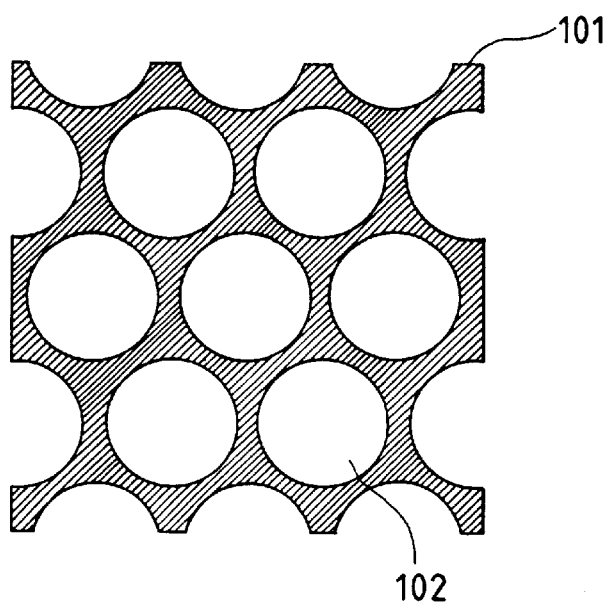

FIGS. 11A and 11B each show a fluorescent film. The fluorescent film 94 in FIG. 10 comprises only a fluorescent substance in the monochrome case. In the case of producing a color image, the fluorescent film is formed by a combination of black conductors 101 and fluorescent substances 102, the black conductors being called black stripes or black matrix depending on array of the fluorescent substances therebetween (FIGS. 11A and 11B). The provision of the black stripes and black matrix is to make black the gaps between the fluorescent substances 103 for three primary colors which are required in color display, rendering color mixing less conspicuous, and to suppress a reduction in contrast caused by reflection of exterior light upon the fluorescent film 94. Materials of the black tripes are not limited to a material containing graphite as a primary component which is usually employed, but may be of any other material so long as it is conductive and has small values in transmissivity and reflectivity of light.

Fluorescent substances are coated on the glass substrate 93 by the precipitation or printing method regardless of whether the image is monochrome or colored.

On the inner surface of the fluorescent film 94, the metal back 95 is usually disposed. The metal back 95 has functions of increasing brightness by mirror-reflecting light, that is emitted from the fluorescent substance to the inner side, toward the face plate 96, serving as an electrode to apply an electron beam accelerating voltage, and protecting the fluorescent substances from being damaged by collisions with negative ions produced in the enclosure. After forming the fluorescent film, the metal back can be fabricated by smoothing the inner surface of the fluorescent film. (this step being usually called filming) and then depositing Al thereon by vacuum evaporation.

To increase conductivity of the fluorescent film 94, the face plate 96 may be provided with a transparent electrode (not shown) on an outer surface of the fluorescent film 94 in some cases.

Before the above bonding, alignment of the respective parts with due care is required since the fluorescent substances in respective colors and the electron-emitting devices must be precisely aligned with each other in the color case.

The enclosure 98 is evacuated through an evacuation tube (not shown) to create a vacuum at a degree of about $10^{-6}$ Torr, and is then hermetically sealed.

The forming process is first carried out by applying a voltage between the device electrodes 5 and 6 through terminals Dox1 to Doxm and Doy1 to Doyn extending outwardly of the enclosure while evacuating the enclosure by a normal vacuum apparatus system, of which pump system comprises e.g., a rotary pump and a turbo pump, through the evacuation tube (not shown), and the activating process is then carried out under a vacuum at a degree of about $10^{-5}$ Torr. After that, the evacuation system is switched to a ultra-high vacuum apparatus system, of which pump system comprises an ion pump or the like that employs no oil, and the enclosure is subjected to baking at temperature of 80° C. to 200° C. for a sufficient period of time. As a result, the electron source comprising an array of the numerous electron-emitting devices in which the electron-emitting regions 3 are formed is completed.

The switching to the ultra-high vacuum apparatus system and the baking are intended to ensure that the device current If and the emission current Ie of each of the surface conduction electron-emitting devices satisfies a monotonously increasing (MI) characteristic uniquely determined with respect to the device voltage, and are not limited in their methods and conditions to the above embodiment.

Additionally, to maintain a vacuum degree in the enclosure 98 after hermetically sealing it, the enclosure may be subjected to gettering. This process is performed by, immediately before or after the sealing, heating a getter disposed in a predetermined position (not shown) in the enclosure 98 with resistance heating or induction heating so as to form an evaporation film of the getter. The getter usually contains Ba or the like as a primary component. The enclosure 98 can be maintained at a vacuum degree higher than $1 \times 10^{-7}$ Torr by combination of the adsorbing action of the evaporation film and the ultra-high evacuation apparatus.

In the image display device of the present invention thus completed, voltages are applied to desired ones of the electron-emitting devices through the terminals Dox1 to Doxm and Doy1 to Doyn extending outwardly of the enclosure, thereby emitting electrons therefrom. Simultaneously, a high voltage of several kV or more is applied to the metal back 95 or the transparent electrode (not shown) through a high-voltage terminal Hv so that the electron beams are accelerated to impinge e upon the fluorescent film 94. As a consequence, the fluorescent substances are excited to radiate lights for displaying an image.

The above-described arrangement is a minimum outline necessary to manufacture the image-forming apparatus suitable for display and other purposes. Details of the apparatus, e.g., materials of the components, are not limited to those described above, but may be s elected, as desired, to be fit for the use of the image-forming apparatus.

The image-forming apparatus of this embodiment is a highly stable image-forming apparatus in which the standing time dependent variations are small. Also, the image-forming apparatus is superior in gradation characteristic and full-color display characteristic, and has high contrast.

In addition to the e above-described image-forming apparatus, the present invention is further applicable to electron beam application apparatus comprising the electron-emitting devices arranged in the enclosure, such as electron beam drawing apparatus, electron beam welding apparatus and electron beam analyzers.

EXAMPLES

The present invention will be described below in more detail in conjunction with Examples.

(Example 1)

The basic structure of a surface conduction electron-emitting device of this Example is similar to that shown in the plan and sectional views of FIGS. 1A and 1B.

The manufacture process of the surface conduction electron-emitting device of this Example is basically as shown in FIGS. 2A to 2C.

A description will now be made of the basic structure and manufacture process of the device of this Example with reference to FIGS. 1A and 1B and FIGS. 2A to 2C.

In FIGS. 1A and 1B, denoted by reference numeral 1 is a substrate, 5 and 6 are device electrodes, 4 is a thin film including electron-emitting region, and 3 is an electron-emitting region.

The manufacture process will be described in detail in the order of successive steps with reference to FIGS. 1A and 1B and FIGS. 2A to 2C.

Step-a

A silicon oxide film being 0.5 micron thick was formed on a washed soda lime glass, as the substrate 1, by sputtering. A pattern to define the device electrodes 5, 6 and the gap L1 therebetween was formed by coating a photoresist (RD-2000N-41, by Hitachi Chemical Co., Ltd.). A Ti film being 5 nm thick and an Ni film being 100 nm thick were then deposited on the substrate 1 in this order by vacuum evaporation. The photoresist pattern was dissolved by an organic solvent to leave the deposited Ni/Ti films by liftoff. The device electrodes 5, 6 having the electrode gap L1 of 3 microns and the electrode width W1 of 300 microns were thus formed.

Step-b

Then, to pattern an electron-emitting region forming thin film 2 into a predetermined shape, an evaporation mask commonly used is coated over the device electrodes, and a Cr film being 100 nm thick was deposited by vacuum evaporation to be patterned by the mask. Organic Pd (ccp4230, by Okuno Pharmaceutical Co., Ltd.) was coated thereon under rotation by using a spinner and then heated for baking at 300° C. for 10 minutes. The electron-emitting region forming thin film 2 thus formed and comprising fine particles of Pd as a primary constituent element had a thickness of 10 nm and a sheet resistance value of $3 \times 10^4$ ohms/□. The term "fine particle film" used herein means, as previously described, a film comprising a number of fine particles aggregated together, and includes films having microstructures in which fine particles are not only individually dispersed, but also adjacent to or overlapped with each other (including an island state).

Subsequently, the Cr film and the electron-emitting region forming thin film 2 after the baking were etched by an acid etchant so as to be formed into the desired pattern.

As a result of the above steps, the device electrodes 5, 6, the electron-emitting region-forming thin films 2, etc. were formed on the substrate 1.

Step-c

Then, the device was set in the measuring apparatus of FIG. 3, which was evacuated by a vacuum pump to a vacuum degree of $2 \times 10^{-5}$ Torr. After that, a voltage was applied between the device electrodes 5, 6 from the power supply 31 for application of the device voltage Vf to the device to thereby carry out the energizing process (forming process). The voltage waveform for the forming process is shown in FIG. 4B.

In FIG. 4B, T1 and T2 indicate a pulse width and interval of the voltage waveform. In this Example, the forming process was performed by setting T1 and T2 to 0.5 millisecond and 10 milliseconds, respectively, and raising a crest value of the triangular wave (i.e., a peak voltage during the forming) in steps of 0.1 V. During the forming process, a resistance measuring pulse at voltage of 0.1 V was also inserted in the interval T2 for measurement of the resistance.

The forming process was ended at the time the value measured by the resistance measuring pulse exceeded about 1 M ohms. At the same time, the voltage application to the device was also ended. The forming voltage Vf for each device was 5.5 V.

Step-d

Subsequently, the device having been subjected to the forming process was subjected to the activating process with a rectangular wave having a crest value of 14V. In the activating process, as described before, a pulse voltage was applied between the device electrodes in the forming apparatus of FIG. 3 while measuring the device current If and the emission current Ie. At this time, the vacuum degree in the measuring apparatus of FIG. 3 was $1.0 \times 10^{-5}$ Torr. The emission current tended to saturate after about 20 minutes at 1.5 $\mu$A, and the activating process was ended then.

Consequently, the electron-emitting device having the electron-emitting region 3 formed thereon was fabricated (FIG. 2C).

Observing the surface conduction electron-emitting device fabricated through the above steps by an electron microscope showed that a coating film was formed over the electron-emitting region after the activating process. With observation by FESEM at a higher magnification, it was seemed that the coating film was also formed around and between metallic fine particles.

As a result of observation using TEM and a Raman spectrophotometer, a carbon coating film consisted of graphite and/or amorphous carbon was observed.

Further, for the surface conduction electron-emitting device fabricated through the above steps, the standing time dependent variations, pulse width dependent variations and device voltage dependent variations, described above in connnection with the embodiment, were measured by using the measuring apparatus of FIG. 3.

The distance between the anode electrode and the electron-emitting device was set to 4 mm, and the potential at the anode electrode was set to 1 kV. The vacuum degree in the vacuum apparatus at the time of measuring an electron emission characteristics was set to about $2 \times 10^{-6}$ Torr (partial pressure of organic materials: $5 \times 10^{-7}$ Torr) by a high vacuum evacuation apparatus for the conventional electron-emitting device, and to about $1 \times 10^{-9}$ Torr (partial pressure of organic materials: higher than $1 \times 10^{-10}$ Torr) by a ultra-high vacuum evacuation apparatus for the electron-emitting device of the invention.

First, the characteristic of emission current versus device voltage (the saturation value described above in connection with the embodiment) of the electron-emitting device of this Example was measured by applying triangular waves with device voltages (crest values) of 14 V and 12 V and a pulse width of 1 millisecond. As a result, as shown in FIG. 8, the emission current exhibited a monotonously increasing characteristic in which it was substantially uniquely determined with respect to the device voltage, and the device voltage dependent variations were below a problematic range. The conventional electron-emitting device exhibited the characteristic shown in FIG. 28. Thus, the emission current was different by more than 30% between 12 V and 14 V of the crest value of the device voltage (sweep voltage). The device current of the electron-emitting device of this Example also exhibited a monotonously increasing characteristic in which it was substantially uniquely determined with respect to the device voltage.

Then, the standing time dependent variations of the electron emitting device of this Example was measured by setting the device voltage to 14 V, the pulse width to 100 microseconds, and the standing time to 10 minutes. As a result, the amount (Is–I)/I×100 of increase in the emission current after the standing time (see FIG. 26) was not greater than 3%. The amount was about 35% for the conventional electron-emitting device.

Further, the pulse width dependent variations of the electron-emitting device of this Example was measured by setting the device voltage to 14 V and the pulse width to 10 microseconds and 100 microseconds. As a result, the pulse width dependent variations at a peak of the emission current was not greater than 2%. The corresponding value for the conventional electron-emitting device was about 20%.

As described above, the electron-emitting device of this Example is a stable electron-emitting device in which variations in the electron emission characteristics are small, and the amount of electrons emitted can be controlled with the pulse width and voltage value of the waveform of the driving voltage (device voltage).

(Example 2)

The electron-emitting device of this Example is different from the device of Example 1 in that the device and the entire measuring apparatus were heated for baking to 100° C. for 10 hours while evacuating by a ultra-high vacuum evacuation apparatus that employs no oil. The vacuum degree in the apparatus at this time was about $1 \times 10^{-8}$ Torr (partial pressure of organic materials: below a detectable limit, higher than $1 \times 10^{-10}$ Torr).

The electron-emitting device of this Example was a stable electron-emitting device in which the standing time dependent variations and the pulse width dependent variations were smaller than those in the electron-emitting device of Example 1.

(Example 3)

In Example 1, the forming process was carried out as follows.

The voltage waveform was rectangular, the pulse width T1 and the pulse interval T2 were set to 0.5 millisecond and 10 milliseconds, respectively, and the voltage value was raised from 0 V to 14 V in steps of 0.1 V.

The vacuum apparatus used for measuring electron emission characteristics was evacuated by a ultra-high vacuum evacuation apparatus, that employs no oil, to obtain a vacuum degree about $7 \times 10^{-7}$ Torr (partial pressure of organic materials: higher than $1 \times 10^{-8}$ Torr) in the vacuum apparatus. As a result of measuring electron emission characteristics under those conditions, the emission current and the device current of the electron-emitting device of this Example each exhibited a monotonously increasing characteristic in which it was substantially uniquely determined with respect to the device voltage. The pulse width dependent variations at a peak of the emission current was not greater than 5%. Thus, the resultant electron-emitting device was a stable electron-emitting device having smaller variations in the electron emission characteristics than the conventional electron-emitting device. Also, the amount of electrons emitted was 1.1 $\mu$A.

The electron-emitting device of this Example is a stable electron-emitting device in which variations in the electron emission characteristics are small, and the amount of electrons emitted can be controlled with the pulse width and voltage value of the waveform of the driving voltage (device voltage).

(Example 4)

This Example concerns an image-forming apparatus in which a number of surface conduction electron-emitting devices are arranged into the simple matrix array.

Figure 12:
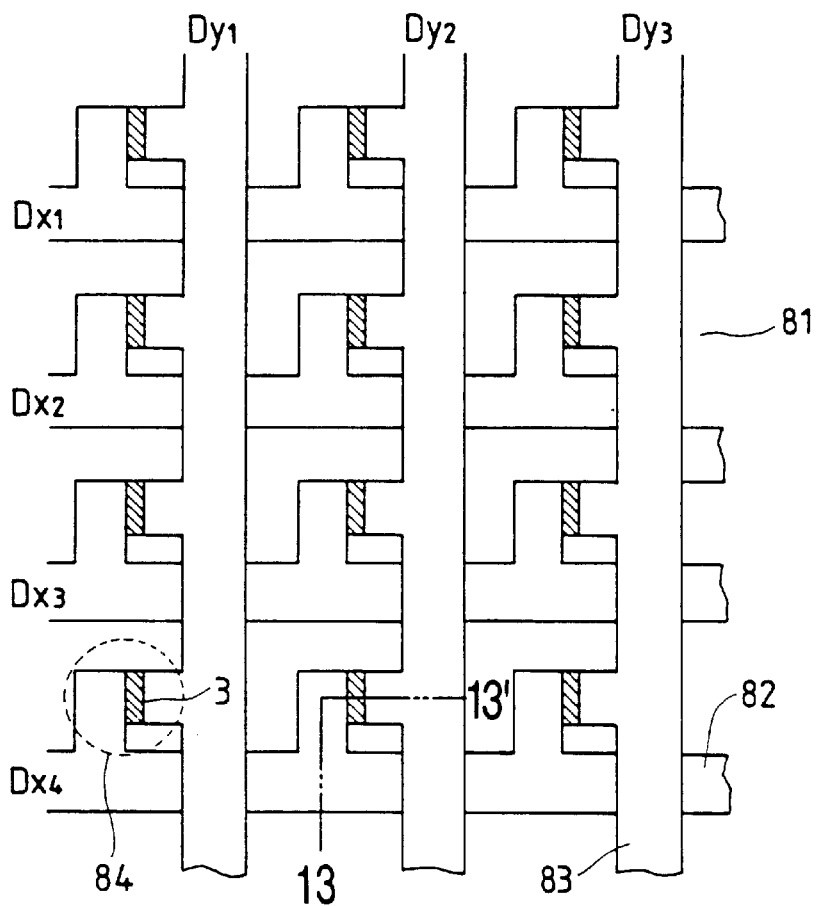
FIG. 12 is a schematic plan view showing the electron source substrate according to Example 4.
Figure 13:
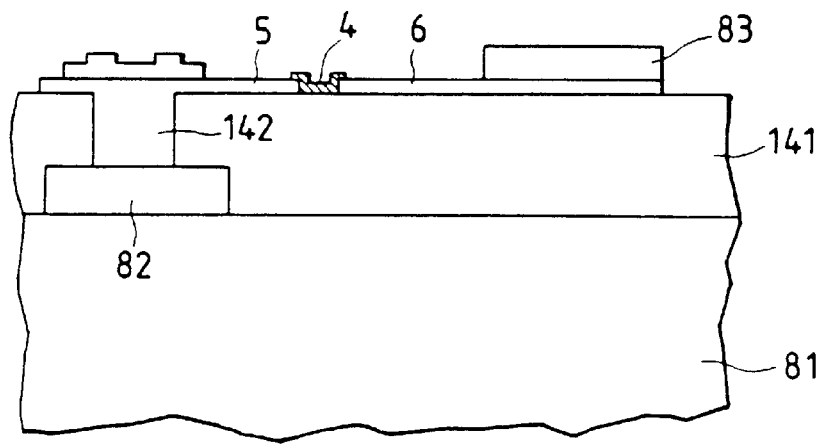
FIG. 13 is a sectional view taken along line 13–13' in the schematic plan view showing the electron source substrate according to Example 4.

FIG. 12 shows a plan view of part of an electron source and FIG. 13 shows a sectional view taken along line 13–13' in FIG. 12. Note that the same reference numerals in FIGS. 12, 13, 14A to 14D, and 15E to 15H denote the same parts. In these drawings, 81 is a substrate, 82 is an X-direction wiring (also called a lower wiring) corresponding to DXn in FIG. 9, 83 is a Y-direction wiring (also called an upper wiring) corresponding to DYn in FIG. 9, 4 is a thin film including electron-emitting region, 5 and 6 are device electrodes, 141 is an interlayer insulating layer, and 142 is a contact hole for electrical connection between the device electrode 5 and the lower wiring 82.

The manufacture process will now be described in detail in the order of successive steps with reference to FIG. 14A to 14D and 15E to 15H.

Step-a

Figure 14A:
FIGS. 14A to 14D and 15E to 15H are sectional views showing successive steps of a process of manufacturing the electron source substrate according to Example 4.

A silicon oxide film being 0.5 micron thick was formed on a washed soda lime glass, as a substrate 81, by sputtering. A Cr film being 50 A thick and an Au film being 6000 A thick were then laminated on the substrate 81 in this order by vacuum evaporation. A photoresist (AZ1370, by Hoechst Co.) was coated thereon under rotation by using a spinner and then baked. Thereafter, by exposing and developing a photomask image, a resist pattern for the lower wirings 82 was formed. The deposited Au/Cr films were selectively removed by wet etching to thereby form the lower wirings 82 in the desired pattern. (FIG. 14A)

Step-b

Figure 14B:

Then, the interlayer insulating layer 141 formed of a silicon oxide film being 1.0 micron thick was deposited over the entire substrate by RF sputtering. (FIG. 14B)

Step-c

Figure 14C:
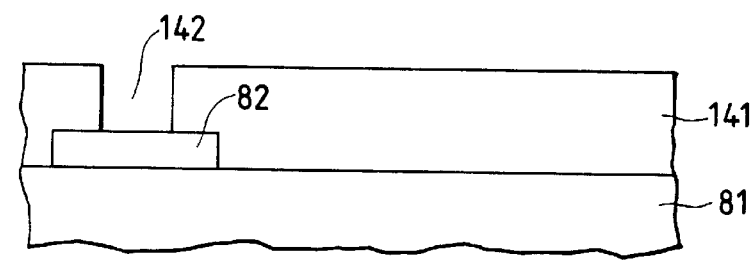

A photoresist pattern for forming the contact holes 142 in the silicon oxide film deposited in Step-b was coated and, by using it as a mask, the interlayer insulating layer 141 was selectively etched to form the contact holes 142. The etching was carried out by the RIE (Reactive Ion Etching) process using a gas mixture of $CF_4$ and $H_2$. (FIG. 14C)

Step-d

Figure 14D:
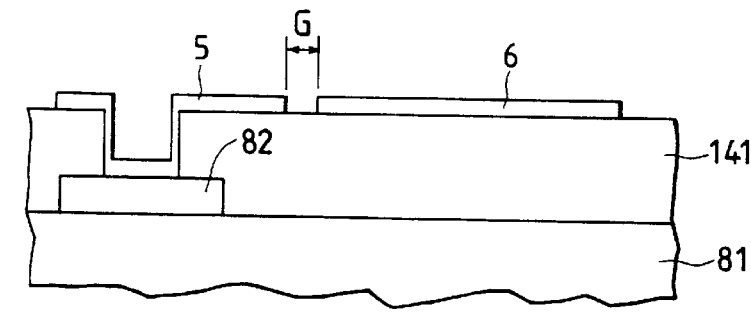

A photoresist (RD-2000N-41, by Hitachi Chemical Co., Ltd.) was formed in a pattern to define the device electrodes 5, 6 and the gaps G therebetween. A Ti film being 50 A thick and an Ni film being 1000 A thick were then deposited thereon in this order by vacuum evaporation. The photoresist pattern was dissolved by an organic solvent to leave the deposited Ni/Ti films by lift-off, whereby the device electrodes 5, 6 each having the electrode gap G of 3 microns and the electrode width W1 of 300 microns were formed. (FIG. 14D)

Step-e

Figure 15E:
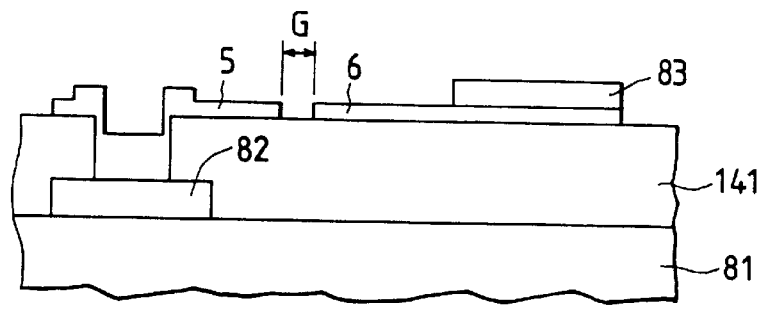

A photoresist pattern for the upper wirings 83 was formed on the device electrodes 5 and 6. A Ti film being 50 A thick and an Au film being 5000 A thick were then deposited thereon in this order by vacuum evaporation. The unnecessary photoresist pattern was removed to form the upper wirings 83 by lift-off. (FIG. 15E)

Step-f

Figure 15F:
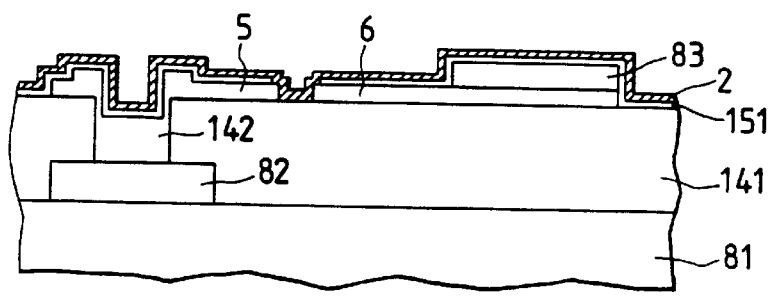

FIG. 15F shows a sectional view of part of a mask used in this step to form an electron-emitting region-forming thin film 2 of the electron-emitting device. The mask has an opening covering each gap G between the device electrodes and the vicinity thereof. A Cr film 151 being 1000 A thick was deposited by vacuum evaporation and patterned by using the mask. Organic Pd (ccp4230, by Okuno Pharmaceutical Co., Ltd.) was coated thereon under rotation by using a spinner and then heated for baking at 300° C. for 10 minutes. The electron-emitting region-forming thin film 2 thus formed and comprising fine particles of Pd as a primary constituent element had a thickness of 100 angstroms and a sheet resistance value of $4.2 \times 10^4$ ohms/□. The term "fine particle film" used herein means, as previously described, a film comprising a number of fine particles aggregated together, and includes films having microstructures in which fine particles are not only individually dispersed, but also adjacent to or overlapped with each other (including an island state). The grain size means a diameter of fine particles whose shape is discernable under the above particle condition. (FIG. 15F)

Step-g

Figure 15G:
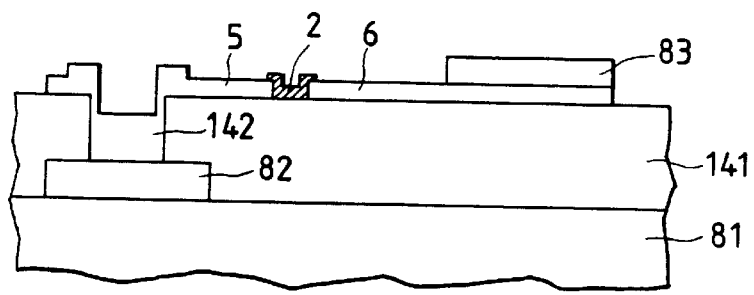

After the baking, the Cr film 151 and the electron-emitting region forming-thin film 2 were etched by an acid etchant to be formed into the desired pattern. (FIG. 15G)

Step-h

Figure 15H:
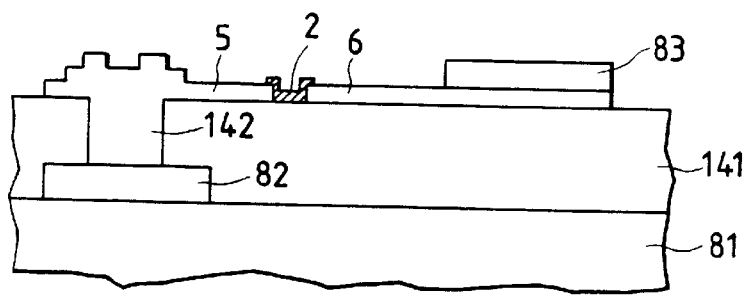

A resist was coated in a pattern to cover the surface other than the contact holes 142. A Ti film being 50 A thick and an Au film being 5000 A thick were then deposited thereon in this order by vacuum evaporation. The unnecessary photoresist pattern was removed to make the contact holes 142 filled with the deposits by lift-off. (FIG. 15H)

As a result of the above steps, the lower wirings 82, the interlayer insulating layer 141, the upper wirings 83, the device electrodes 5, 6, the electron-emitting region-forming thin films 2, etc. were formed on the insulating substrate 81.

A description will now be made, with reference to FIG. 10 and FIGS. 11A and 11B, of an example in which a display device is made up by using the electron source manufactured as above.

The substrate 81 on which a number of planar type surface conduction electron-emitting devices were manufactured through the foregoing steps was fixed onto a rear plate 91. Then, a face plate 95 (comprising a fluorescent film 94 and a metal back 95 laminated on an inner surface of a glass substrate 93) was disposed 5 mm above the substrate 81 through a support frame 92 and, after applying frit glass to joined portions between the face plate 96, the support frame 92 and the rear plate 91, the assembly was baked in the atmosphere at 400° C. for 15 minutes for bonding the joined portions (FIG. 10). Frit glass was also used to fix the substrate 81 to the rear plate 91.

In FIG. 10, denoted by 84 is an electron-emitting device and 82, 83 are X- and Y-direction wirings, respectively.

The fluorescent film 94 comprises only a fluorescent substance in the monochrome case. For producing a color image, this Example employs a stripe pattern of fluorescent substances. Thus, the fluorescent film 94 was fabricated by first forming black stripes and then coating fluorescent substances in respective colors in gaps between the black stripes. The black stripes were formed by using a material containing graphite as a primary component which is usually employed. Fluorescent substances were coated on the glass substrate 93 by the slurry method.

On the inner surface of the fluorescent film 94, the metal back 95 is usually disposed. After forming the fluorescent film, the metal back 95 was fabricated by smoothing the inner surface of the fluorescent film (this step being usually called filming) and then depositing Al thereon by vacuum evaporation. To increase conductivity of the fluorescent film 94, the face plate 96 may be provided with a transparent electrode (not shown) on an outer surface of the fluorescent film 94 in some cases. Such a transparent electrode was not provided in this Example because sufficient conductivity was obtained with the metal back only.

Before the above bonding, alignment of the respective parts was carried out with due care since the fluorescent substances in respective colors and the electron-emitting devices must be precisely aligned with each other in the color case.

The atmosphere in the glass enclosure thus completed was evacuated by a vacuum pump through an evacuation tube (not shown). After reaching a sufficient degree of vacuum, a voltage was applied between the electrodes 5 and 6 of the electron-emitting devices 84 through terminals Dox1 to Doxm and Doy1 to Doyn extending outwardly of the enclosure for producing the electron-emitting regions 3 through the forming process of the electron-emitting region forming thin films 2. The voltage waveform used for the forming process was the same as that shown in FIG. 4B. Specifically, the forming process was performed in this Example by setting T1 and T2 to 1 millisecond and 10 milliseconds, respectively, and creating a vacuum atmosphere of about $1 \times 10^{-5}$ Torr (FIG. 15E).

Then, by raising the applied voltage up to a crest value of 14 V in the same rectangular waveform as that in the forming process, the device current If and the emission current Ie were produced under a vacuum at a degree of $2 \times 10^{-5}$ Torr.

The electron-emitting regions 3 thus formed were in a condition that fine particles containing paradium as a primary constituent element were dispersed therein and had an average grain size of 30 angstrom. After that, the evacuation system was switched to a ultra-high vacuum apparatus system, of which pump system comprises an ion pump or the like that employs no oil, and the enclosure was subjected to baking at 120° C. for a sufficient period of time. The vacuum degree after the baking was about $1 \times 10^{-8}$ Torr.

Next, the evacuation tube (not shown) was heated and fused together by using a gas burner to hermetically seal the enclosure.

Finally, to maintain the vacuum degree after the sealing, the enclosure was subjected to gettering by the high-frequency heating method.

In the image display device of the present invention thus completed, a scan signal and a modulation siganl were applied from signal generating means (not shown) to desired ones of the electron-emitting devices through the terminals Dox1 to Doxm and Doy1 to Doyn extending outwardly of the enclosure, thereby emitting electrons therefrom. Simultaneously, a high voltage of several kV or more was applied to the metal back 95 or the transparent electrode (not shown) through a high-voltage terminal Hv so that the electron beams were accelerated to impinge upon the fluorescent film 94. The fluorescent substances were thereby excited to radiate light for displaying an image.

The image-forming apparatus of this embodiment was a highly stable image-forming apparatus in which the standing time dependent variations were small. Also, the image-forming apparatus was superior in gradation characteristic and full-color display characteristic, and had high contrast.

(Example 5)

Figure 16:
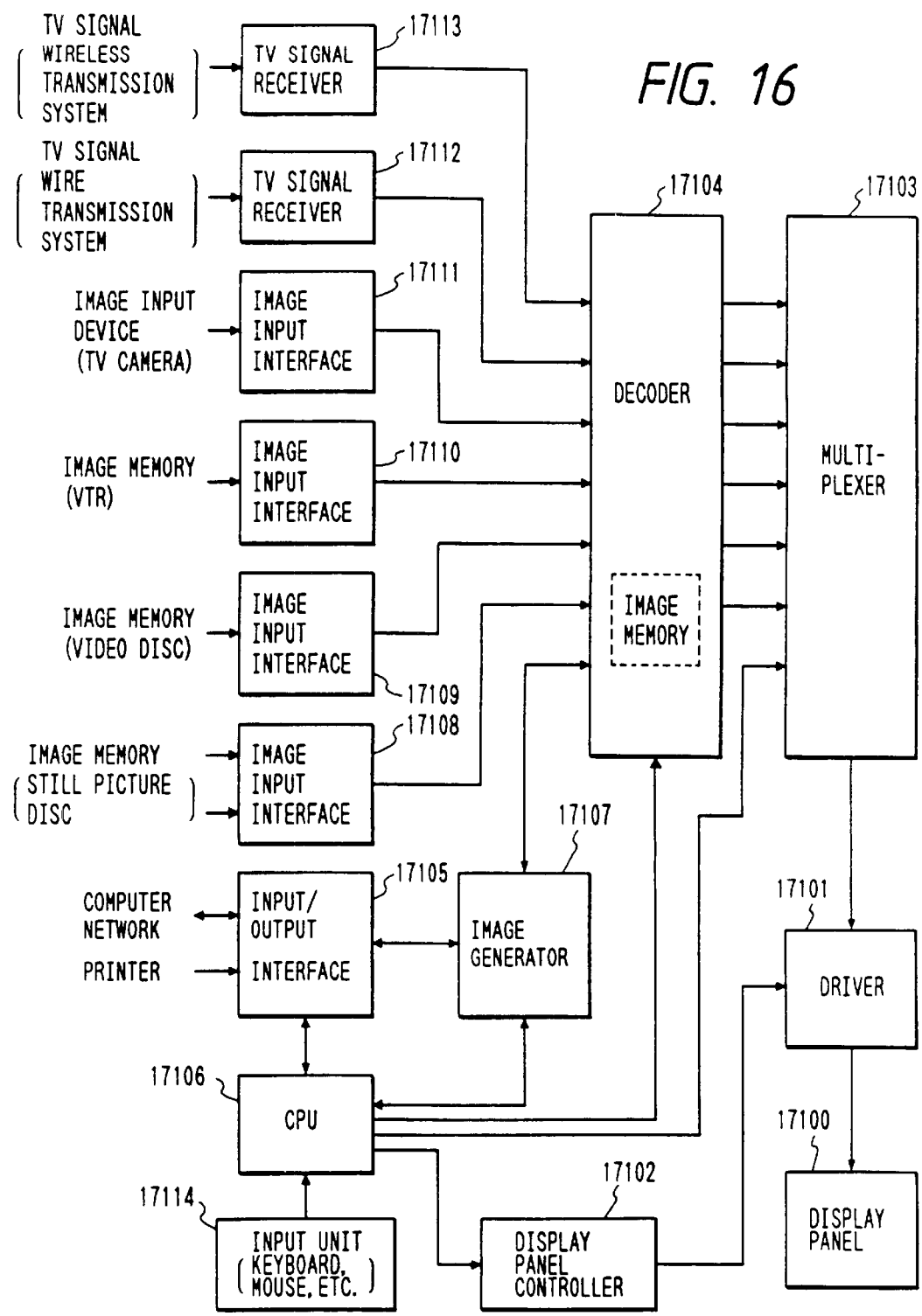
FIG. 16 is a block diagram of a display device according to Example 5.

FIG. 16 is a block diagram showing one example of a display device in which a display panel using the above-described surface conduction electron-emitting devices in the electron beam source is arranged to be able to display image information provided from various image information sources including TV broadcasting, for example.

In FIG. 16, denoted by 17100 is a display panel, 17101 is a driver for the display panel, 17102 is a display controller, 17103 is a multiplexer, 17104 is a decoder, 17105 is an input/output interface, 17106 is a CPU, 17107 is an image generator, 17108, 17109 and 17110 are image memory interfaces, 17111 is an image input interface, 17112 and 17113 are TV signal receivers, and 17114 is an input unit.

When the present display device receives a signal, e.g., a TV signal, including both video information and voice information, the device of course displays an image and reproduces voices simultaneously. Circuits necessary for reception, separation, reproduction, processing, storage, etc. of voice information, which are not directly related to the features of the present invention, such as a speaker and the like will not described here.

Functions of the above parts will be described below along a flow of image signals.

First, the TV signal receiver 17113 is a circuit for receiving a TV image signal transmitted through a wireless transmission system in the form of electric waves or spatial optical communication, for example. A type of the TV signal to be received is not limited to particular one, but may be any type of the NTSC-, PAL- and SECAM-standards, for example. Another type TV signal (e.g., so-called high-quality TV signal including the MUSE-standard type) having a larger number of scan lines than the above types is a signal source fit to utilize the advantage of the above display panel which is suitable for an increase in the screen size and the number of pixels. The TV signal received by the TV signal receiver 17113 is output to the decoder 17104.

Then, the TV signal receiver 17112 is a circuit for receiving a TV image signal transmitted through a wire transmission system in the form of coaxial cables or optical fibers. As with the TV signal receiver 17113, a type of the TV signal to be received by the TV signal receiver 17112 is not limited to particular one. The TV signal received by the receiver 17112 is also output to the decoder 17104.

The image input interface 17111 is a circuit for taking in an image signal supplied from an image input device such as a TV camera or an image reading scanner, for example. The image signal taken in by the interface 17111 is output to the decoder 17104.

The image memory interface 17110 is a circuit for taking in an image signal stored in a video tape recorder (hereinafter abbreviated to a VTR). The image signal taken in by the interface 17110 is output to the decoder 17104.

The image memory interface 17109 is a circuit for taking in an image signal stored in a video disk. The image signal taken in by the interface 17109 is output to the decoder 17104.

The image memory interface 17108 is a circuit for taking in an image signal from a device storing still picture data, such as a so-called still picture disk. The image signal taken in by the interface 17108 is output to the decoder 17104.

The input/output interface 17105 is a circuit for connecting the display device to an external computer or computer network, or an output device such as a printer. It is possible to perform not only input/output of image data and character/figure information, but also input/output of a control signal and numeral data between the CPU 17106 in the display device and the outside in some cases.

The image generator 17107 is a circuit for generating display image data based on image data and character/figure information input from the outside via the input/output interface 17105, or image data and character/figure information output from the CPU 17106. Incorporated in the image generator 17107 are, for example, a rewritable memory for storing image data and character/figure information, a read only memory for storing image patterns corresponding to character codes, a processor for image processing, and other circuits required for image generation.

The display image data generated by the image generator 17107 is usually output to the decoder 17104, but may also be output to an external computer network or a printer via the input/output interface 17105 in some cases.

The CPU 17106 carries out primarily operation control of the display device and tasks relating to generation, selection and editing of a display image.

For example, the CPU 17106 outputs a control signal to the multiplexer 17103 for selecting one of or combining ones of image signals to be displayed on the display panel as desired. In this connection, the CPU 17106 also outputs a control signal to the display panel controller 17102 depending on the image signal to be displayed, thereby properly controlling the operation of the display device in terms of picture display frequency, scan mode (e.g., interlace or non-interlace), the number of scan lines per picture, etc.

Furthermore, the CPU 17106 outputs image data and character/figure information directly to the image generator 17107, or accesses to an external computer or memory via the input/output interface 17105 for inputting image data and character/figure information. It is a matter of course that the CPU 17106 may be used in relation to any suitable tasks for other purposes than the above. For example, the CPU 17106 may directly be related to functions of producing or processing information as with a personal computer or a word processor. Alternatively, the CPU 17106 may be connected to an external computer network via the input/output interface 17105, as mentioned above, to execute numerical computations and other tasks in cooperation with external equipment.

The input unit 17114 is employed when a user enters commands, programs, data, etc. to the CPU 17106, and may be any of various input equipment such as a keyboard, mouse, joy stick, bar code reader, and voice recognition device.

The decoder 17104 is a circuit for reverse-converting various image signals input from the circuit 17107 to 17113 into signals for three primary colors, or a luminance signal, an I signal and a Q signal. As indicated by dot lines in the drawing, the decoder 17104 preferably includes an image memory therein. This is because the decoder 17104 also handles those TV signals including the MUSE-standard type, for example, which require an image memory for the reverse-conversion. Further, the provision of the image memory brings about an advantage of making it possible to easily display a still picture, or to easily perform image processing and editing, such as thinning-out, interpolation, enlargement, reduction and synthesis of images, in cooperation with the image generator 17107 and the CPU 17106.

The multiplexer 17103 selects a display image in accordance with the control signal input from the CPU 17106 as desired. In other words, the multiplexer 17103 selects desired one of the reverse-converted image signals input from the decoder 17104 and outputs it to the driver 17101. In this connection, by switchingly selecting two or more of the image signals in a display time for one picture, different images can also be displayed in plural respective areas defined by dividing one screen as with the so-called multi-screen television.

The display panel controller 17102 is a circuit for controlling the operation of the driver 17101 in accordance with a control signal input from the CPU 17106.

As a function relating to the basic operation of the display panel, the controller 17102 outputs to the driver 17101 a signal for controlling, by way of example, the operation sequence of a power supply (not shown) for driving the display panel. Also, as a function relating to a method of driving the display panel, the controller 17102 outputs to the driver 17101 signals for controlling, by way of example, a picture display frequency and a scan mode (e.g., interlace or non-interlace).

Depending on cases, the controller 17102 may output to the driver 17101 control signals for adjustment of image quality in terms of luminance, contrast, tone and sharpness of the display image.

The driver 17101 is a circuit for producing a drive signal applied to the display panel 17100. The driver 17101 is operated in accordance with the image signal input from the multiplexer 17103 and the control signal input from the display panel controller 17102.

With the various components arranged as shown in FIG. 16 and having the functions as described above, the display device can display image information input from a variety of image information sources on the display panel 17100. More specifically, various image signals including the TV broadcasting signal are reverse-converted by the decoder 17104, and at least one of them is selected by the multiplexer 17103 upon demand and then input to the driver 17101. On the other hand, the display controller 17102 issues a control signal for controlling the operation of the driver 17101 in accordance with the image signal to be displayed. The driver 17101 applies a drive signal to the display panel 17100 in accordance with both the image signal and the control signal. An image is thereby displayed on the display panel 17100. A series of operations mentioned above are controlled under supervision of the CPU 17106.

In addition to simply displaying the image information selected from plural items with the aid of the image memory built in the decoder 17104, the image generator 17107 and the CPU 17106, the present display device can also perform, on the image information to be displayed, not only image processing such as enlargement, reduction, rotation, movement, edge emphasis, thinning-out, interpolation, color conversion, and conversion of image aspect ratio, but also image editing such as synthesis, erasure, coupling, replacement, and inset. Although not especially specified in the description of this Example, there may also be provided a circuit dedicated for processing and editing of voice information, as well as the above-explained circuits for image processing and editing.

Accordingly, even a single unit of the present display device can have various functions of a display for TV broadcasting, a terminal for TV conferences, an image editor handling still and motion pictures, a computer terminal, an office automation terminal including a word processor, a game machine and so on; hence it can be applied to a very wide range of industrial and domestic fields.

It is needless to say that FIG. 16 only shows one example of the configuration of the display device using the display panel in which the electron beam source comprises the surface conduction electron-emitting devices, and the present invention is not limited to the illustrated configuration. For example, those circuits of the components shown in FIG. 16 which are not necessary for the intended purpose of use may be dispensed with. On the contrary, depending on the intended purpose of use, other components may be added. When the present display device is employed in, e.g., a TV telephone, it is preferable to provide, as additional components, a TV camera, an audio microphone, an illuminator, and a transmission/reception circuit including a modem.

In the present display device, particularly, the display panel having the electron beam source which comprises the surface conduction electron-emitting devices can easily be reduced in thickness and, therefore, the display device can have a smaller depth. Additionally, since the display panel having the electron beam source which comprises the surface conduction electron-emitting devices can easily increase the screen size and also can provide high luminance and a superior characteristic of viewing angle, the present display device can display a more realistic and impressive image with good viewability.

(Example 6)

This Example concerns with an image-forming apparatus comprising a number of surface conduction electron-emitting devices and control electrodes (grids).

The image-forming apparatus of this Example was manufactured by substantially the same process as that used in Example 4 and, therefore, its manufacture process will not be described here.

A description will first be made of an electron source comprising a number of surface conduction electron-emitting devices disposed on a substrate and a display device employing the electron source.

Figure 17:
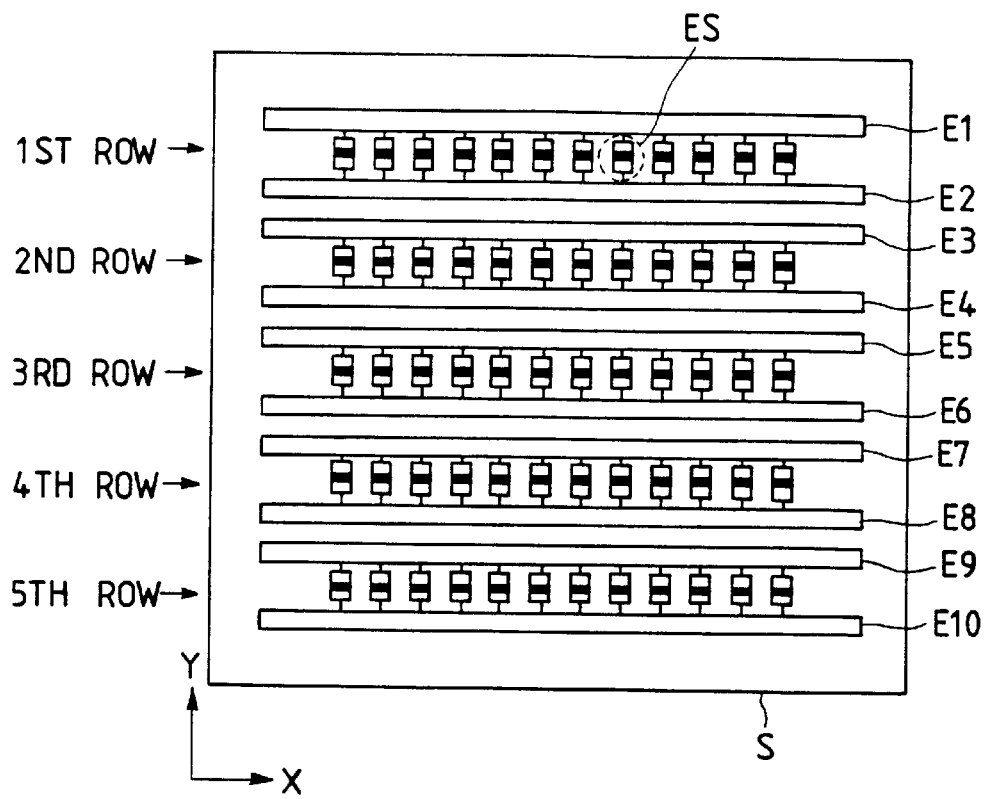
FIGS. 17 and 18 are schematic views showing of an electron source substrate for use in an image-forming apparatus according to Example 6.
Figure 18:
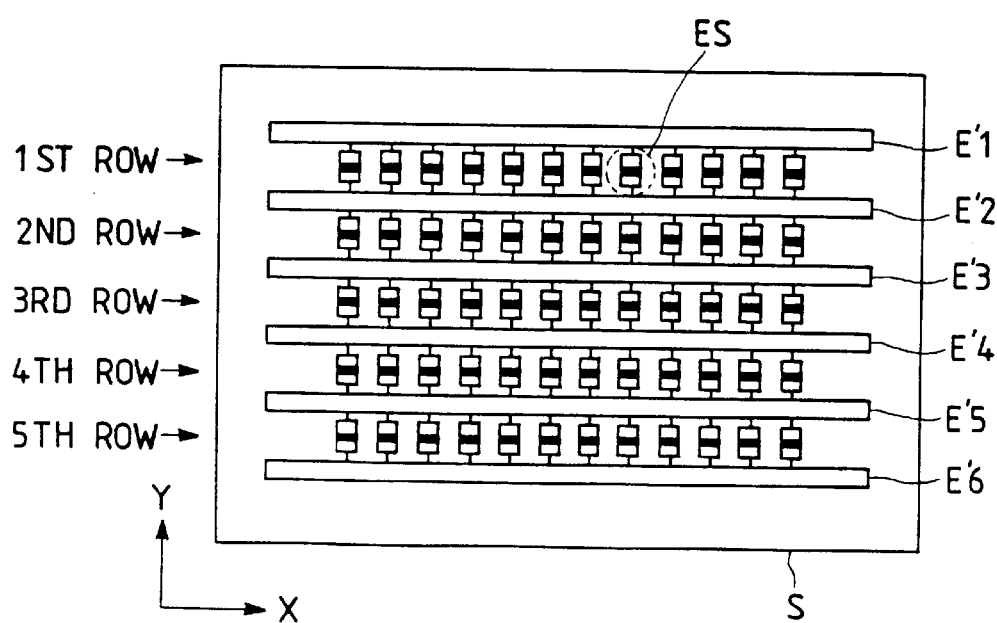

FIGS. 17 and 18 are schematic views for explaining two examples of the electron source comprising a number of surface conduction electron-emitting devices disposed on a substrate.

In FIG. 17, S represents an insulating substrate made of glass, for example, ES encircled by a dotted line represents a surface conduction electron-emitting device formed on the substrate S, and E1 to E10 represent wiring electrodes for interconnecting the surface conduction electron-emitting devices. The surface conduction electron-emitting devices are formed on the substrate into a plurality of rows extending in the X-direction (the row being hereinafter referred to as a device row). The surface conduction electron-emitting devices making up each device row are electrically interconnected in parallel by the wiring electrodes on both sides thereof (for example, the devices in the first row are interconnected by the wiring electrodes E1 and E2 on both sides thereof).

In the electron source of this Example, the device rows can be driven independently of one another by applying a proper driving voltage between the respective wiring electrodes. Specifically, a proper voltage exceeding an electron emitting threshold is applied to those device rows from which electron beams are to be emitted, and a proper voltage (e.g., 0 Volts) not exceeding the electron emitting threshold is applied to those device rows from which electron beams are not to be emitted. (In the following description, a proper voltage exceeding the electron emitting threshold will be given as VE Volts).

In another example of the electron source shown in FIG. 18, S represents an insulating substrate made of glass, for example, ES encircled by a dotted line represents a surface conduction electron-emitting device formed on the substrate S, and E'1 to E'6 represent wiring electrodes for interconnecting the surface conduction electron-emitting devices. As with the example of FIG. 17, the surface conduction electron-emitting devices in this example are also formed on the substrate into a plurality of rows extending in the X-direction, and the surface conduction electron-emitting devices in each device row are electrically interconnected in parallel by the wiring electrodes. Further, in this example, confronting ends of the electron-emitting devices in two adjacent device rows are interconnected by the single wiring electrode such that, for example, the wiring electrode E'2 serves to interconnect not only one ends of the electron-emitting devices in the first device row, but also one ends of the electron-emitting devices in the second device row. The electron source of FIG. 18 is advantageous in that when the surface conduction electron-emitting devices and the wiring electrodes being of the same configurations are employed, the spacing between the device rows in the Y-direction is smaller than that in the electron source of FIG. 17.

In the electron source of FIG. 18, the device rows can also be driven independently of one another by applying a proper driving voltage between the respective wiring electrodes. Specifically, the voltage of VE Volts is applied to those device rows from which electrons are to be emitted, and the voltage of 0 Volts is applied to those device rows from which electrons are not to be emitted. When only the third device row is to be driven, for example, the potential of 0 Volts is applied to the wiring electrodes E'1 to E'3, and the potential of VE Volts is applied to the wiring electrodes E'4 to E'6. As a result, the voltage of VE−0=VE Volts is applied to the third device row, while the voltage of 0−0=0 Volts or VE−VE=0 Volts is applied to the other device rows. When simultaneously driving the second and fifth device rows, for example, the potential of 0 Volts is applied to the wiring electrodes E'1, E'2 and E'6, and the potential of VE Volts is applied to the wiring electrodes E'3, E'4 and E'5. In this way, it is possible to selectively drive any desired device row in the electron source of FIG. 18 as well.

While the total twelve surface conduction electron-emitting devices are arrayed in the X-direction per row in the electron sources of FIGS. 17 and 18 for convenience of illustration, the number of devices is not limited to twelve, but may be arrayed in a larger number. Also, while the five device rows are arrayed in the Y-direction, the number of device rows is not limited to five, but may be arrayed in a larger number.

A description will now be made of an example of a flat type CRT using the above electron source.

Figure 19:
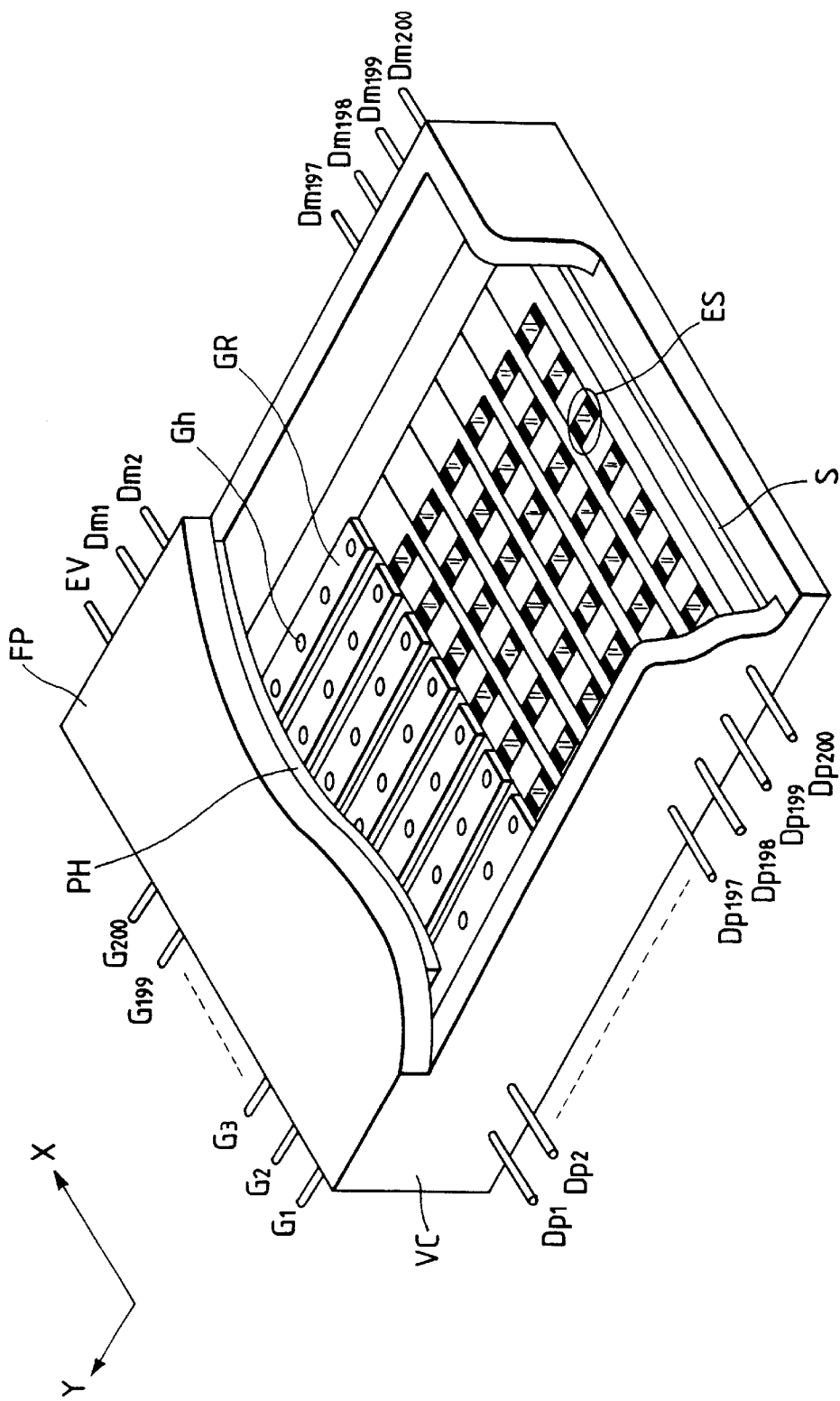
FIGS. 19 and 22 are perspective views of panel constructions of the image-forming apparatus according to Example 6.

FIG. 19 shows a panel structure of a flat type CRT having the electron source of FIG. 17. In FIG. 19, VC represents a vacuum container made of glass, and FP as a part of the vacuum container represents face plate on the display surface side. A transparent electrode made of ITO, for example, is formed on an inner surface of the face plate FP, and fluorescent substances in red, green and blue are separately coated on the transparent electrode in a mosaic or striped pattern. For the sake of simplification of the drawing, the transparent electrode and the fluorescent substances are both indicated by PH together in FIG. 19. A black matrix or black stripes well known in the field of CRT may be disposed between the fluorescent substances in respective colors, or a metal back layer also well known in the art may be formed over the fluorescent substances. The transparent electrode is electrically connected to the outside of the vacuum container through a terminal EV so that a voltage for accelerating the electron beam may be applied thereto.

Further, S represents an electron source substrate fixed to an inner bottom surface of the vacuum container VC and, as described above in connection with FIG. 17, the surface conduction electron-emitting devices are arrayed on the substrate. In this example, there are 200 device rows each of which comprises 200 devices interconnected in parallel. Two wiring electrodes of each device row are alternately connected to electrode terminals Dp1 to Dp200 and Dm1 to Dm200 provided on both lateral surfaces of the panel, so that an electrical driving signal may be applied to the wiring electrodes.

The glass container VC (FIG. 19) thus completed was evacuated by a vacuum pump through an evacuation tube (not shown). After reaching a sufficient degree of vacuum, a voltage was applied to each of the electron-emitting devices ES through the terminals Dp1 to Dp200 and Dm1 to Dm200 extending outwardly of the container for the forming process. The voltage waveform used for the forming process was the same as that shown in FIG. 4B. Specifically, the forming process was performed in this example by setting T1 and T2 to 1 millisecond and 10 milliseconds, respectively, and creating a vacuum atmosphere of about $1 \times 10^{-5}$ Torr (FIG. 15E).

Then, by raising the applied voltage up to a crest value of 14 V in the same triangular waveform as that in the forming process, the device current If and the emission current Ie were produced under a vacuum at a degree of $2 \times 10^{-5}$ Torr.

The electron-emitting regions thus formed were in a condition that fine particles containing paradium as a primary constituent element were dispersed therein and had an average grain size of 30 angstrom. After that, the evacuation system was switched to a ultra-high vacuum apparatus system, of which pump system comprises an ion pump or the like that employs no oil, and the container was subjected to baking at 120° C. for sufficient period of time. The vacuum degree after the baking was about $1 \times 10^{-8}$ Torr.

Next, the evacuation tube (not shown) was heated and fused together by using a gas burner to hermetically seal the container.

Finally, to maintain the vacuum degree after the sealing, the container was subjected to gettering by the high-frequency heating method, thereby completing the image-forming apparatus.

Between the substrate S and the face plate FP, grid electrodes GR in a striped pattern are provided. Total 200 grid electrodes GR are disposed independently of one another side by side perpendicularly to the device rows (i.e., in the Y-direction), and aperture Gh for allowing electron beams to pass therethrough are defined in each of the grid electrodes. While the circular apertures Gh are shown as being defined in one-to-one relation to the surface conduction electron-emitting devices, a multiplicity of mesh-like apertures may be defined in some cases. The grid electrodes are electrically connected to the outside of the vacuum container through terminals G1 to G200. Note that the shapes and set positions of the grid electrodes are not always limited to those shown in FIG. 19 so long as the grid electrodes can modulate the electron beams emitted from the surface conduction electron-emitting devices. For example, the grid electrodes may be disposed around or adjacent to the surface conduction electron-emitting devices.

In this display panel, an XY matrix of 200×200 is made up by the rows of surface conduction electron-emitting devices and the columns of grid electrodes. Therefore, by driving (scanning) the device rows one by one sequentially and, at the same time, applying modulation signals for one line of an image to the columns of grid electrodes in synch with the scanning, irradiation of the electron beams to the fluorescent substances is controlled so as to display the image on a line-by-line basis.

Figure 20:
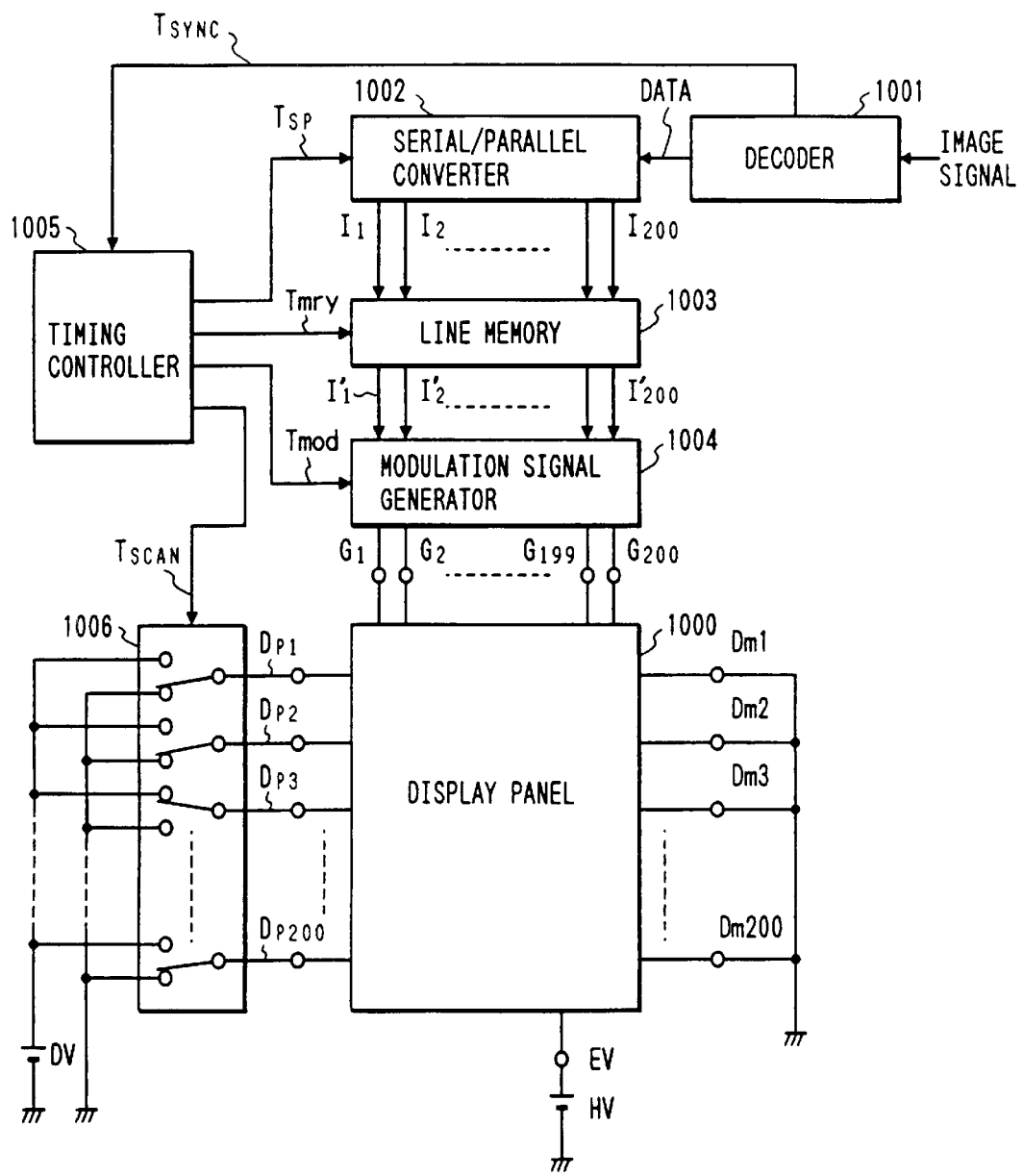
FIGS. 20 and 23 are block diagrams of electrical circuits for driving the image-forming apparatus according to Example 6.
Figure 21:
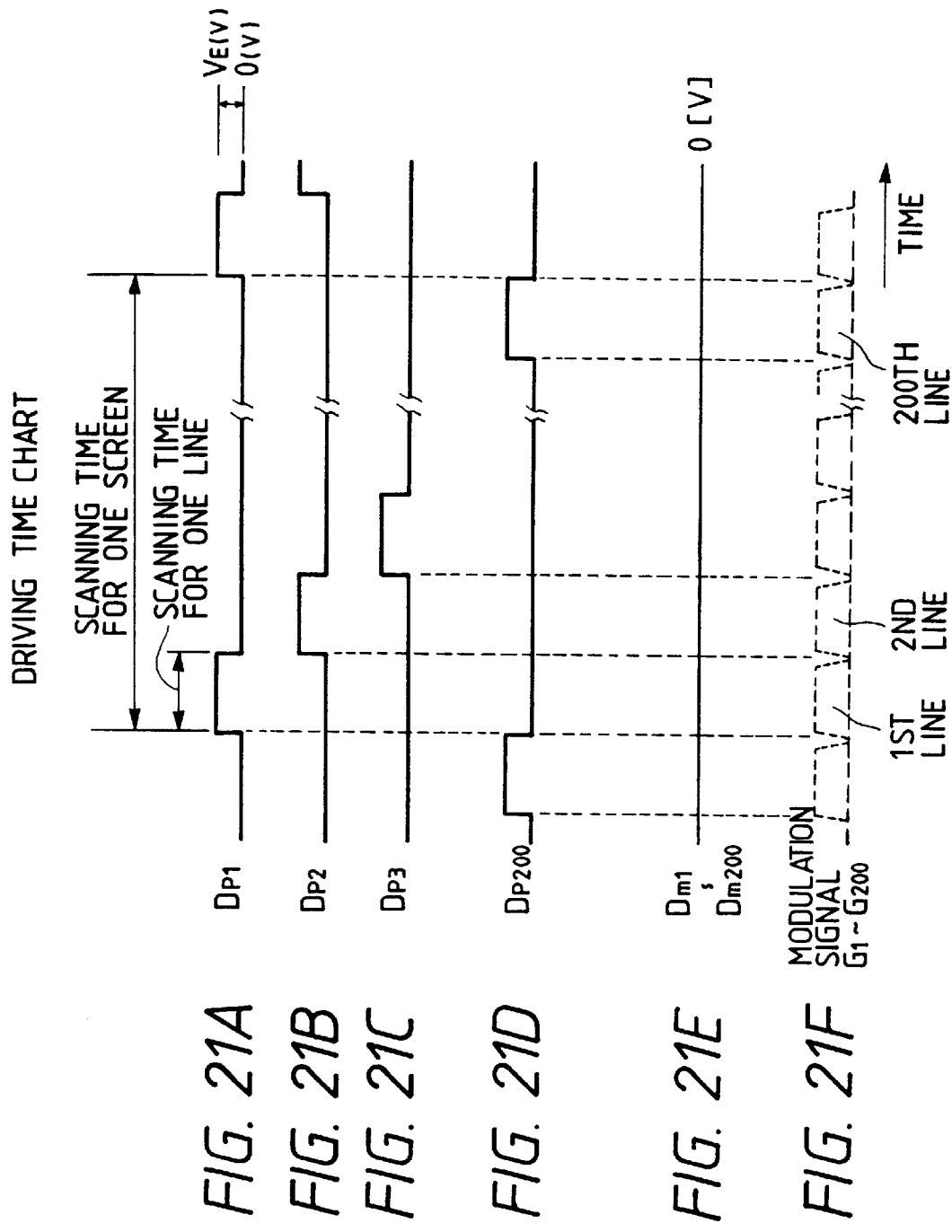
FIGS. 21A to 21F and 24A to 24I are timing charts for explaining operation of the image-forming apparatus according to Example 6.

FIG. 20 shows, in the form of a block diagram, an electrical circuit for driving the display panel of FIG. 19. Referring to FIG. 20, denoted by 1000 is the display panel of FIG. 19, 1001 is a decoder for decoding a composite image signal applied from the outside, 1002 is a serial/parallel converter 1003 is a line memory, 1004 is a modulation signal generator, 1005 is a timing controller, and 1006 is a scan signal generator. Electrode terminals of the display panel 1000 are connected to the corresponding electrical circuits; i.e., a terminal EV is connected to a voltage source HV for generating an acceleration voltage of 10 kilovolts, terminals G1 to G200 are connected to the modulation signal generator 1004, terminals Dp1 to Dp200 are connected to the scan signal generator 1006, and terminals Dm1 to Dm200 are grounded.

The functions of the components will be described below. The decoder 1001 is a circuit for decoding a composite image signal, e.g., an NTSC TV signal, applied from the outside. Thus, the decoder 1001 separates a luminance signal component and a synch signal component from the composite image signal, and outputs the former component as a Data signal to the serial/parallel converter 1002 and the latter component as a Tsynch signal to the timing controller 1005. In other words, the decoder 1001 arranges luminance data for respective color components of RGB in match with a color pixel array of the display panel 1000 and outputs them sequentially to the serial/parallel converter 1002, and it also extracts a vertical synch signal and a horizontal synch signal and outputs them to the timing controller 1005. The timing controller 1005 generates various timing control signals for matching the timings in operations of the components based on the synch signal Tsynch. Specifically, the timing controller 1005 outputs Tsp to the serial/parallel converter 1002, Tmry to the line memory 1003, Tmod to the modulation signal generator 1004, and Tscan to the scan signal generator 1006.

The serial/parallel converter 1002 samples the luminance signal Data input from the decoder 1001 sequentially in accordance with the timing signal Tsp input from the timing controller 1005, and outputs the sampled signals, as 200 parallel signals I1 to I200, to the line memory. At the time data of one line has been completely serial/parallel-converted, the timing controller 1005 outputs a writing timing control signal Tmry to the line memory 1003. Upon receiving Tmry, the line memory 1003 stores the contents of I1 to I200 and outputs those contents, as I'1 to I'200, to the modulation signal generator 1004. I'1 to I'200 are held in the line memory until a next writing control signal Tmry is applied to the line memory.

The modulation signal generator 1004 is a circuit for generating modulation signals applied to the grid electrodes of the display panel 1000 in accordance with the luminance data for one line of an image input from the line memory 1003. The modulation signals are applied to the modulation signal terminals G1 to G200 simultaneously in synch with a timing control signal Tmod generated by the timing controller 1005. The modulation signal may be a voltage modulated signal of which voltage is changed in accordance with the luminance data of an image, or a pulse-width modulated signal of which duration is changed in accordance with the luminance data.

The scan signal generator 1006 is a circuit for generating voltage pulses to selectively drive the rows of surface conduction electron-emitting devices in the display panel 1000. Specifically, the scan signal generator 1006 changes over a built-in switching circuit in response to a timing control signal Tscan generated by the timing controller 1005, and selectively applies an appropriate driving voltage VE Volts which is generated by a constant-voltage source DV and exceeds the electron emission threshold of the surface conduction electron-emitting devices, or a ground level (i.e., 0 Volts) to the terminals Dp1 to Dp200.

With the above-described circuits, the driving signal is applied to the display panel 1000 at the timing shown in a timing chart of FIGS. 21A to 21F. FIGS. 21A to 21D show part of signals applied from the scan signal generator 1006 to the terminals Dp1 to Dp200 of the display panel. As will be seen from these drawings, a voltage pulse with an amplitude of VE Volts is successively applied to the terminals Dp1, Dp2, Dp3 . . . in this order in units of one-line display time of an image. On the other hand, the terminals Dm1 to Dm200 are always connected to the ground level (0 Volts). Therefore, the device rows are driven by the voltage pulses successively from the first row for producing electron beams.

In synch with the above driving sequence, a modulation signal for one line of an image is simultaneously applied from the modulation signal generator 1004 to one of the terminals G1 to G200 in the timed relationship as indicated by a dotted line. Then, the modulation signal is also shifted successively in synch with shifting of the scan signal so that an image of one frame is displayed. By continuously repeating the above operation, TV motion pictures can be displayed.

Subsequent to the description of the flat type CRT having the eletron source of FIG. 17, a flat type CRT having the electron source of FIG. 18 will now be described with reference to FIG. 22.

Figure 22:
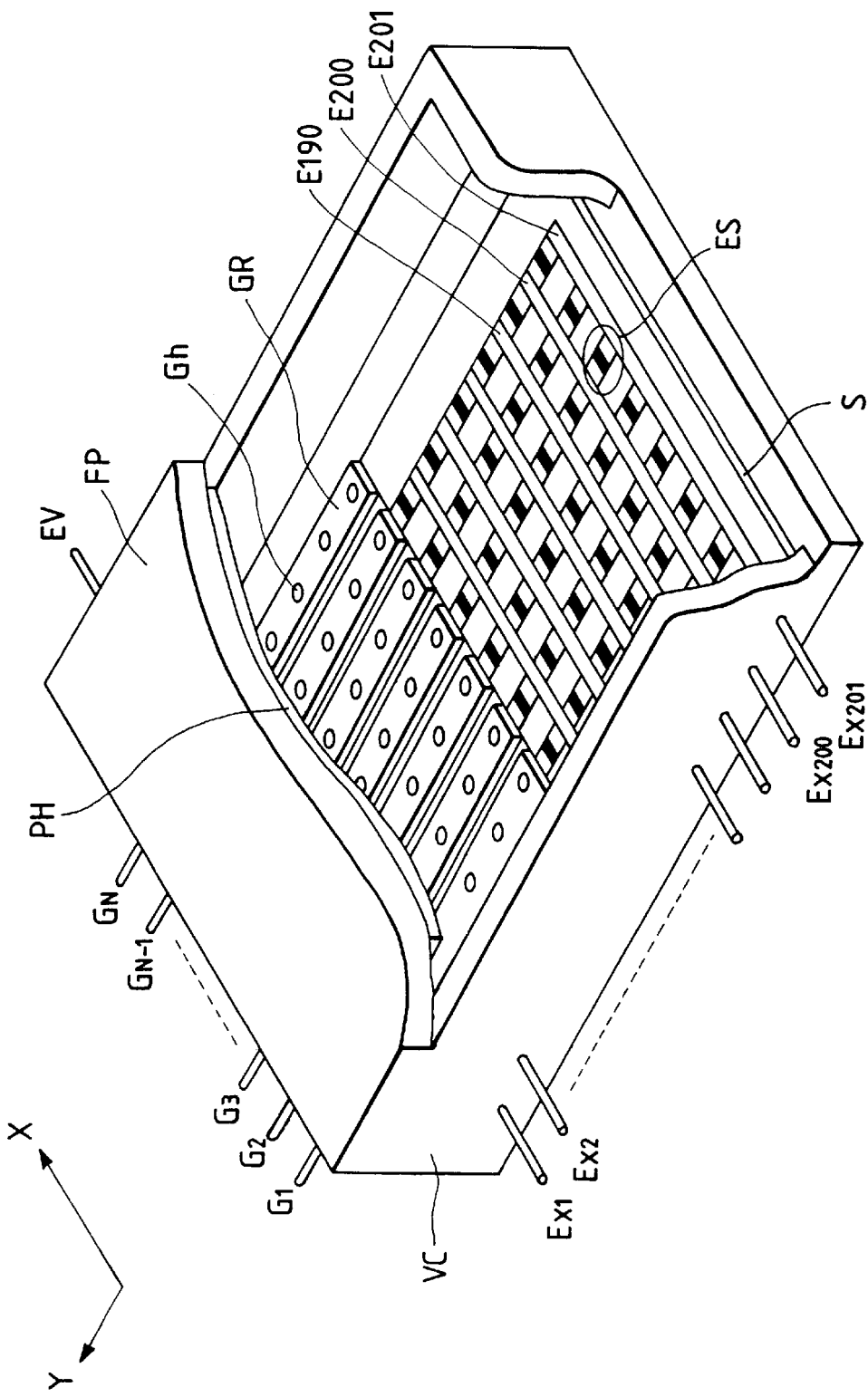

The flat type CRT of FIG. 22 is constructed by replacing the electron source of the flat type CRT of FIG. 19 with the electron source of FIG. 18. An XY matrix of 200×200 is similarly made up by the rows of surface conduction electron-emitting devices and the columns of grid electrodes. However, as the 200 rows of surface conduction electron-emitting devices are interconnected in parallel for each row by 201 lines of wiring electrodes E1 to E201, the vacuum container is provided with 201 electrode terminals Ex1 to Ex2O1.

The glass container VC (FIG. 20) thus completed was evacuated by a vacuum pump through an evacuation tube (not shown). After reaching a sufficient degree of vacuum, a voltage was applied to each of the electron-emitting devices ES through the terminals Ex1 to Ex201 extending outwardly of the container for the forming process. The voltage waveform used for the forming process was the same as that shown in FIG. 4B. Specifically, the forming process was performed in this example by setting T1 and T2 to 1 millisecond and 10 milliseconds, respectively, and creating a vacuum atmosphere of about $1\times10^{-5}$ Torr (FIG. 15E).

Then, by raising the applied voltage up to a crest value of 14 V in the same triangular waveform as that in the forming process, the device current If and the emission current Ie were produced under a vacuum at a degree of $2\times10^{-5}$ Torr.

The electron-emitting regions thus formed were in a condition that fine particles containing paradium as a primary constituent element were dispersed therein and had an average grain size of 30 angstrom. After that, the evacuation system was switched to an ultra high vacuum apparatus system, of which pump system comprises an ion pump or the like that employs no oil, and the container was subjected to baking at 120° C. for a sufficient period of time. The vacuum degree after the baking was about $1\times10^{-8}$ Torr.

Next, the evacuation tube (not shown) was heated and fused together by using a gas burner to hermetically seal the container.

Finally, to maintain the vacuum degree after the sealing, the container was subjected to gettering by the high-frequency heating method, thereby completing the image-forming apparatus.

Figure 23:
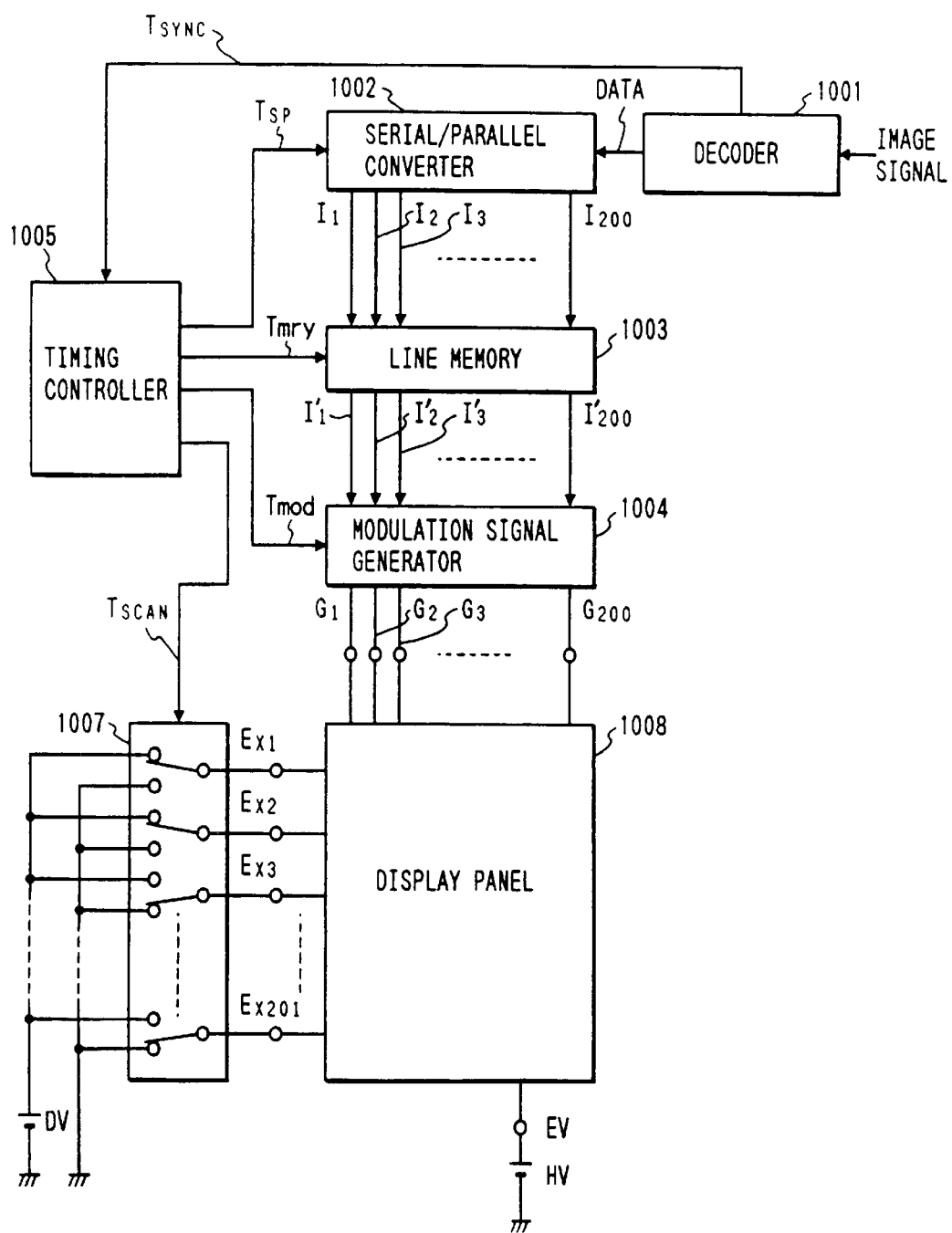
Figure 24:
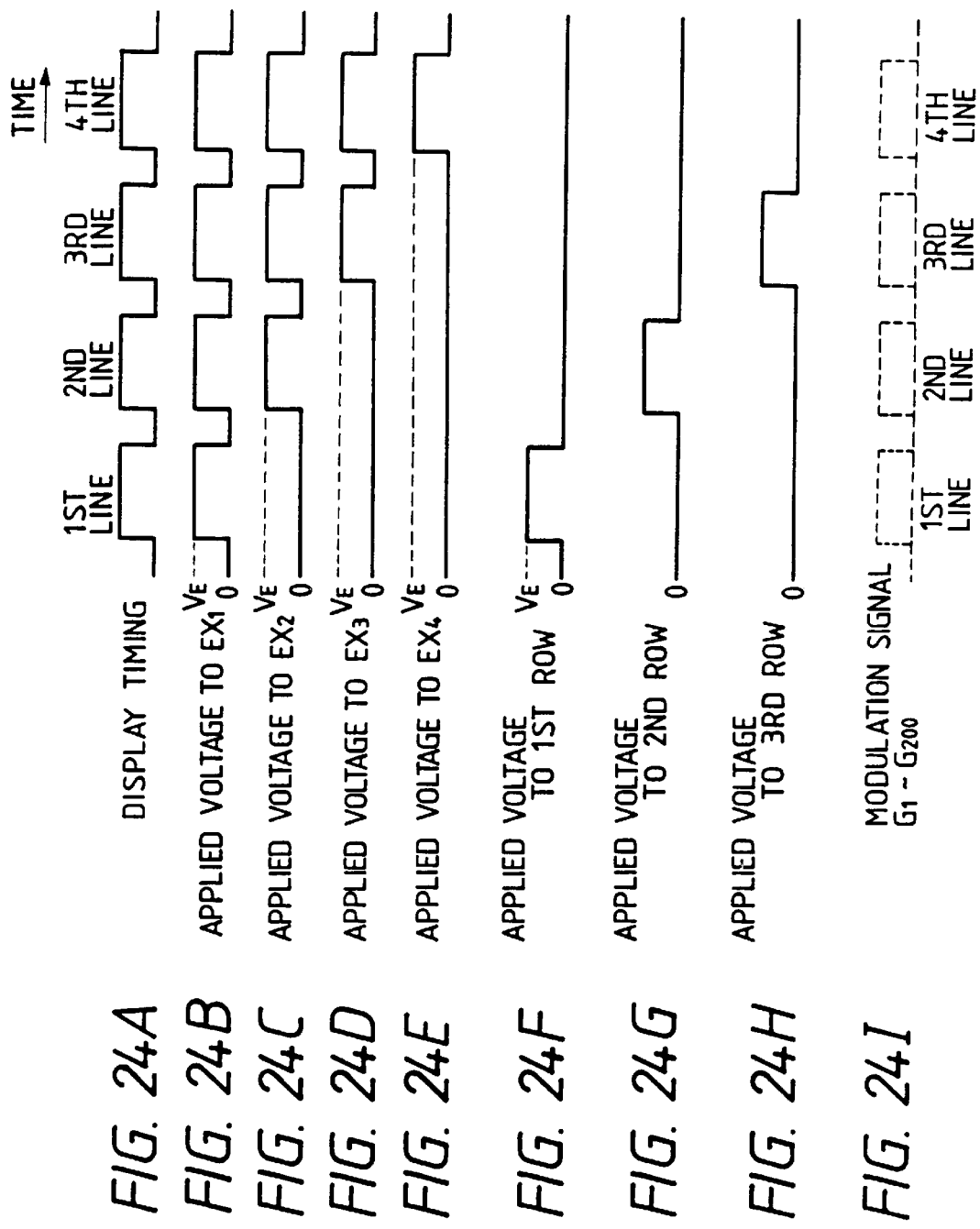
Figure 25:
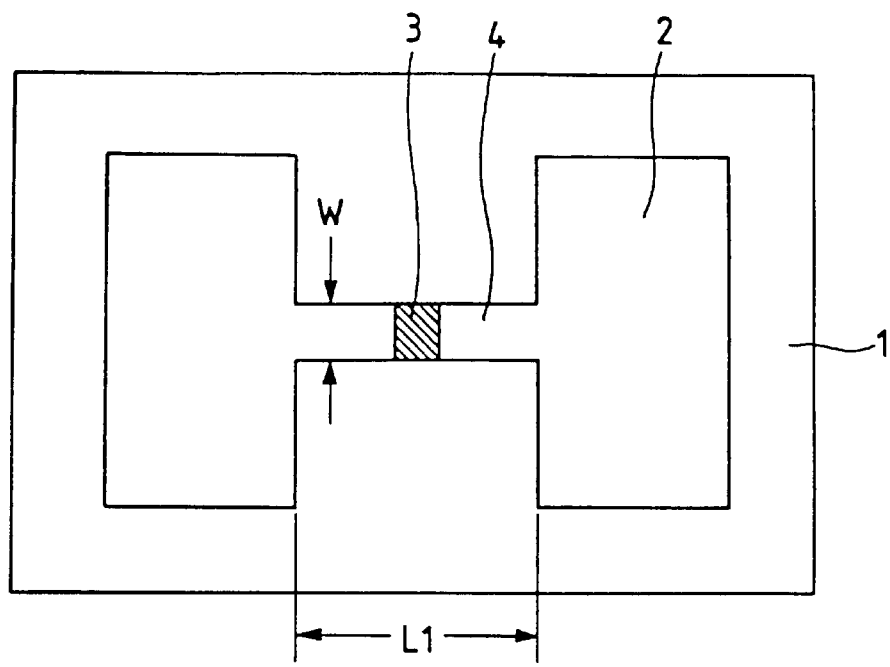
FIG. 25 is a schematic view of a conventional surface conduction electron-emitting device.

FIG. 23 shows an electrical circuit for driving the display panel 1008. The circuit is basically the same as that shown in FIG. 20 except for a scan signal generator 1007. The scan signal generator 1007 selectively applies an appropriate driving voltage VE Volts which is generated by the constant-voltage source DV and exceeds the electron emission threshold of the surface conduction electron-emitting devices, or a ground level (i.e., 0 Volts) to the terminals of the display panel. The timing at which the driving voltage is applied is shown in timing charts of FIGS. 24B to 24E. In order that the display panel carries out display operation in the timed relationship shown in FIG. 24A, driving signals shown in FIGS. 24B to 24E are applied from the scan signal generator 1007 to the electrode terminals Ex1 to Ex4. As a result, the rows of surface conduction electron-emitting devices are supplied with respective voltages, shown in FIGS. 24F to 24H, so as to be driven successively row by row. In synch with that driving sequence, a modulation signal is output from the modulation signal generator 1004 in the timed relationship shown in FIG. 24I, thereby displaying an image successively.

The image-forming apparatus of this Example was an image-forming apparatus in which the standing time dependent variations were small and produced images were highly stable as with Example 4. Also, the image-forming apparatus was superior in gradation characteristic and full-color display characteristic, and had high contrast.

According to the electron beam apparatus comprising the surface conduction electron-emitting devices of the present invention, as described hereinabove, since the amount of carbon compounds in the vacuum apparatus is reduced to be as small as possible, the emission current and the device current of the electron-emitting device each exhibits a monotonously increasing characteristic in which it is uniquely determined with respect to the device voltage. Also, highly stable electron emission characteristics are obtained with less variations in the amount of electrons emitted depending upon the period of time during which the devices are left not driven (i.e., standing time) and the vacuum degree. Further, the amount of electrons emitted can be controlled with the pulse width and voltage value of the driving voltage (device voltage).

Additionally, the image-forming apparatus comprising the surface conduction electron-emitting devices of the present invention can produce stable display images with the smaller standing time dependent variations, and also can produce full-color images with a superior gradation characteristic and high contrast.

What is claimed is:

1. An image forming apparatus, comprising an electron beam apparatus that comprises an enclosure in which an electron-emitting device having an electron-emitting region between opposite electrodes is disposed, wherein a material containing carbon as a main ingredient is present at the electron emitting region and its vicinity, and wherein an interior of said enclosure is maintained under an atmosphere in which a partial pressure of residual carbon compounds is less than $1\times10^{-10}$ Torr, so as to prevent materials containing carbon as a main ingredient from further depositing on said electron emitting device.

2. An image forming apparatus according to claim 1, wherein said electron-emitting device exhibits a monotonically increasing characteristic in which the emission current is uniquely determined with respect to a device voltage.

3. An image forming apparatus according to claim 2, wherein said electron-emitting device is of a surface conduction type.

4. An image forming apparatus according to claim 1, wherein said electron-emitting device exhibits a characteristic such that an emission current and a device current are uniquely determined with respect to a device voltage.

5. An image forming apparatus according to claim 1, wherein said electron-emitting device exhibits a monotonously increasing characteristic in which an emission current and a device current are uniquely determined with respect to a device voltage.

6. An image forming apparatus according to any one of claims 1 to 5, wherein the interior of said enclosure is maintained under an atmosphere effective to prevent structural changes of said electron-emitting device.

7. An image forming apparatus according to any of claims 1 to 5, wherein the interior of said enclosure is maintained under a vacuum atmosphere at a degree higher than $1\times10^{-6}$ Torr.

8. An image forming apparatus according to claim 7, wherein said vacuum atmosphere is at a degree higher than $1\times10^{-8}$ Torr.

9. An image forming apparatus apparatus according to claim 1, wherein, between said opposite electrodes, an electroconductive film is deposited and is subjected to a forming process.

10. An image forming apparatus according to claim 1, wherein said material containing carbon is deposited on said electron-emitting region from an organic material existing in the atmosphere by applying voltage between said opposite electrodes.

11. An image forming apparatus for forming an image responsive to an input signal, comprising an enclosure in which an electron-emitting device having an electron-emitting region between opposite electrodes and an image forming member are disposed, wherein a material containing carbon as a main ingredient is present at the electron emitting region and its vicinity, and wherein an interior of said enclosure is maintained under an atmosphere in which a partial pressure of residual carbon compounds is less than $1\times10^{-10}$ Torr, so as to prevent materials containing carbon as a main ingredient from further depositing on said electron emitting device.

12. An image forming apparatus according to claim 1, 2, 4, 5 or 11, wherein said material containing carbon as a main ingredient is graphite, amorphous carbon or a mixture thereof.

13. An image forming apparatus according to any one of claims 1 to 5 or to claim 11, wherein said electron-emitting device is disposed in plural number, each of the plurality of electron-emitting devices emitting electrons in response to an input signal.

14. An image forming apparatus according to claim 13, wherein said plurality of electron-emitting devices are arranged into an array and are connected to m lines of X-direction wirings and n lines of Y-direction wirings, said wirings being electrically insulated from one another.

15. An image forming apparatus according to claim 11, wherein, between said opposite electrodes, an electroconductive film is disposed and is subjected to a forming process.

16. An image forming apparatus according to claim 11, wherein said material containing carbon is deposited on said electron-emitting region from an organic material existing in the atmosphere by applying a voltage between said opposite electrodes.

17. An image forming apparatus according to claim 11, wherein said image forming member is a phosphor.

18. An image forming apparatus comprising at least one electron beam apparatus that comprises an enclosure in which an electron-emitting device is disposed, wherein said electron-emitting device has an electron-emitting region in which material containing carbon exists, and wherein an interior of said enclosure is maintained under an atmosphere in which a partial pressure of residual carbon compounds is less than $1\times10^{-10}$ Torr.

19. An image forming apparatus according to claim 18, wherein said electron-emitting device region is sandwiched between opposite electrodes.

20. An image forming apparatus according to claim 18, wherein said material containing carbon is a main ingredient in said electron-emitting region.

21. An image forming apparatus according to claim 18, wherein said electron-emitting device exhibits a monotonically increasing characteristic in which an emission current is uniquely determined with respect to a device voltage.

22. An image forming apparatus according to claim 18, wherein said electron-emitting device exhibits a characteristic such that an emission current and a device current are uniquely determined with respect to a device voltage.

23. An image forming apparatus according to claims 18, wherein said electron-emitting device exhibits a monotonously increasing characteristic in which an emission current and a device current are uniquely determined with respect to a device voltage.

24. An image forming apparatus according to claim 18, wherein said electron-emitting device exhibits a characteristic such that an emission current is uniquely determined with respect to a device voltage.

25. An image forming apparatus according to claim 18, wherein said electron-emitting device is of a surface conduction type.

26. An image forming apparatus according to claim 18, further comprising opposite electrodes, wherein said electron-emitting device comprises an electroconductive film disposed between said opposite electrodes and subjected to a forming process.

27. An image forming apparatus according to claim 18, further comprising opposite electrodes, said electron-emitting region being disposed between said opposite electrodes, wherein said material containing carbon is one deposited on said electron-emitting region from an organic material existing in the atmosphere by applying a voltage between said opposite electrodes.

28. An image forming apparatus according to claim 18, wherein said material contains carbon as a main ingredient.

29. An image forming apparatus according to claim 18, further comprising a phosphor as an image forming member.

30. An image forming apparatus according to any one of claims 18-24, wherein the interior of said enclosure is maintained under an atmosphere effective to prevent structural changes of said electron-emitting device.

31. An image forming apparatus according to any one of claims 18-24, wherein the interior of said enclosure is maintained under a vacuum atmosphere at a degree higher than $1\times10^{-6}$ Torr.

32. An image forming apparatus according to claim 31, wherein said vacuum atmosphere is at a degree higher than $1\times10^{-8}$ Torr.

33. An image forming apparatus according to any one of claims 18-24, wherein said material containing carbon as a main ingredient is graphite, amorphous carbon or a mixture thereof.

34. An image forming apparatus according to any one of claims 18-24, wherein said electron-emitting device is disposed in plural number, each of the plurality of electron-emitting devices emitting electrons in response to an input signal.

35. An image forming apparatus according to claim 34, wherein said apparatus comprises plural rows of said electron-emitting devices, each row including the plurality of electron-emitting devices interconnected at their both ends in parallel by wirings, and modulation means for modulating electron beams emitted from said electron-emitting devices.

36. An image forming apparatus according to claim 34, wherein said plurality of electron-emitting devices are arranged into an array and are connected to m lines of X-direction wirings and n lines of Y-direction wirings, said wirings being electrically insulated from one another.

37. An image forming apparatus comprising at least one electron beam apparatus that comprises an enclosure in which an electron-emitting device is disposed, wherein said electron-emitting device has an electron-emitting region in which a material containing carbon exists, and wherein an interior of said enclosure is maintained under an atmosphere in which a partial pressure of residual carbon compounds is less than $1 \times 10^{-8}$ Torr.

38. An image forming apparatus according to claim 37, wherein said electron-emitting region is sandwiched between opposite electrodes.

39. An image forming apparatus according to claim 37, wherein said material containing carbon is a main ingredient in said electron-emitting region.

40. An image forming apparatus according to claim 37, wherein said electron-emitting device exhibits a monotonically increasing characteristic in which an emission current is uniquely determined with respect to a device voltage.

41. An image forming apparatus according to claim 37, wherein said electron-emitting device exhibits a characteristic such that an emission current and a device current are uniquely determined with respect to a device voltage.

42. An image forming apparatus according to claim 37, wherein said electron-emitting device exhibits a monotonously increasing characteristic in which an emission current and a device current are uniquely determined with respect to a device voltage.

43. An image forming apparatus according to claim 37, wherein said electron-emitting device exhibits a characteristic such that an emission current is uniquely determined with respect to a device voltage.

44. An image forming apparatus according to claim 37, wherein said electron-emitting device is of a surface conduction type.

45. An image forming apparatus according to claim 37, further comprising opposite electrodes, wherein, between said opposite electrodes, an electroconductive film is disposed and is subjected to a forming process.

46. An image forming apparatus according to claim 37, further comprising opposite electrodes, said electron-emitting region being disposed between said opposite electrodes, wherein said material containing carbon is deposited on said electron-emitting region from an organic material existing in the atmosphere by applying a voltage between said opposite electrodes.

47. An image forming apparatus according to claim 37, wherein said material contains carbon as a main ingredient.

48. An image forming apparatus according to claim 37, further comprising a phosphor as an image forming member.

49. An image forming apparatus according to any one of claims 37-43, wherein the interior of said enclosure is maintained under an atmosphere effective to prevent structural changes of said electron-emitting device.

50. An image forming apparatus according to any one of claims 37-43, wherein said material containing carbon as a main ingredient is graphite, amorphous carbon or a mixture thereof.

51. An image forming apparatus according to any one of claims 37-43, wherein said electron-emitting device is disposed in plural number, each of the plurality of electron-emitting devices emitting electrons in response to an input signal.

52. An image forming apparatus according to claim 51, wherein said apparatus comprises plural rows of said electron-emitting devices, each row including the plurality of electron-emitting devices interconnected at their both ends in parallel by wirings, and modulation means for modulating electron beams emitted from said electron-emitting devices.

53. An image forming apparatus according to claim 51, wherein said plurality of electron-emitting devices are arranged into an array and are connected to m lines of X-direction wirings and n lines of Y-direction wirings, said wirings being electrically insulated from one another.

* * * * *

UNITED STATES PATENT AND TRADEMARK OFFICE
CERTIFICATE OF CORRECTION

PATENT NO. : 6,555,957 B1
DATED : April 29, 2003
INVENTOR(S) : Ichiro Nomura et al.

It is certified that error appears in the above-identified patent and that said Letters Patent is hereby corrected as shown below:

Column 2,
Line 28, "form," should read -- form --.

Column 3,
Line 24, "devices" should read -- device --.

Column 9,
Line 36, "as" should read -- as a --.

Column 10,
Line 28, "a" should read -- an --.

Column 13,
Line 19, "though" should read -- thought --.

Column 16,
Line 29, "tripes" should read -- stripes --; and
Line 46, "film." should read -- film --.

Column 17,
Line 37, "e upon" should read -- upon --;
Line 44, "s elected" should read -- selected --; and
Line 52, "the e" should read -- the --.

Column 19,
Line 44, "a" should read -- an --.

Column 20,
Lines 22 and 41, "a" should read -- an --.

Column 23,
Line 27, "a" should read -- an --; and
Line 39, "siganl" should read -- signal --.

Column 24,
Line 10, "like" should read -- like, --; and
Line 17, "to" should read -- to a --.

Column 27,
Line 12, "with an" should read -- an --.

UNITED STATES PATENT AND TRADEMARK OFFICE
CERTIFICATE OF CORRECTION

PATENT NO.    : 6,555,957 B1
DATED         : April 29, 2003
INVENTOR(S)   : Ichiro Nomura et al.

It is certified that error appears in the above-identified patent and that said Letters Patent is hereby corrected as shown below:

Column 28,
Line 1, "ends" should read -- end --.

Column 29,
Line 20, "30 angstrom." should read -- 30 angstroms. --;
Line 21, "a" should read -- an --; and
Line 24, "for" should read -- for a --.

Column 31,
Line 33, "Ex2O1." should read -- Ex20l. --; and
Line 52, "30 angstrom." should read -- 30 angstroms. --.

Column 33,
Line 9, "claims 1 to 5," should read -- claims 1, 2, 4 or 5 --;
Line 19, "apparatus apparatus" should read -- apparatus --; and
Line 45, "claims 1 to 5" should read -- claims 1, 2, 4 or 5 --.

Column 34,
Line 6, "device region" should read -- region --; and
Line 19, "claims 18," should read -- claim 18, --.

Signed and Sealed this

Twenty-third Day of March, 2004

JON W. DUDAS
*Acting Director of the United States Patent and Trademark Office*